United States Patent
Bolm et al.

(10) Patent No.: US 12,503,446 B2
(45) Date of Patent: Dec. 23, 2025

(54) BROMODOMAIN INHIBITORS

(71) Applicant: FORSCHUNGSZENTRUM JÜLICH GMBH, Jülich (DE)

(72) Inventors: Carsten Bolm, Aachen (DE); Marcus Frings, Aachen (DE); Jan-Hendrik Schöbel, Berlin (DE); Nicolas Chatain, Aachen (DE); Bianca Altenburg, Aachen (DE); Giulia Rossetti, Aachen (DE); Jonas Gossen, Aachen (DE); Steffen Koschmieder, Aachen (DE)

(73) Assignee: FORSCHUNGSZENTRUM JÜLICH GMBH, Jülich (DE)

( * ) Notice: Subject to any disclaimer, the term of this patent is extended or adjusted under 35 U.S.C. 154(b) by 886 days.

(21) Appl. No.: 17/772,604

(22) PCT Filed: Oct. 27, 2020

(86) PCT No.: PCT/EP2020/080156
§ 371 (c)(1),
(2) Date: Aug. 17, 2022

(87) PCT Pub. No.: WO2021/083879
PCT Pub. Date: May 6, 2021

(65) Prior Publication Data
US 2022/0372004 A1    Nov. 24, 2022

(30) Foreign Application Priority Data
Oct. 31, 2019    (DE) .................. 10 2019 129 527.0

(51) Int. Cl.
*C07D 239/78*    (2006.01)
*A61P 35/00*    (2006.01)
*A61P 35/02*    (2006.01)

(52) U.S. Cl.
CPC .......... *C07D 239/78* (2013.01); *A61P 35/02* (2018.01)

(58) Field of Classification Search
CPC ......... C07D 239/78; A61P 35/02; A61P 35/00
See application file for complete search history.

(56) References Cited

FOREIGN PATENT DOCUMENTS

| WO | 2010042867 A2 | 4/2010 | |
|----|---|---|---|
| WO | 2010141074 A2 | 12/2010 | |
| WO | 2011137089 A1 | 11/2011 | |
| WO | WO-2013027168 A1 * | 2/2013 | ........... C07D 215/22 |
| WO | 2016203112 A1 | 12/2016 | |

OTHER PUBLICATIONS

Cecil Textbook of Medicine, 20th Ed, vol. 1, 1997 (Year: 1997).*
Wu Q, Qian W, Sun X, Jiang S. Small-molecule inhibitors, immune checkpoint inhibitors, and more: FDA-approved novel therapeutic drugs for solid tumors from 1991 to 2021. J Hematol Oncol. Oct. 8, 2022;15(1): 143. doi: 10.1186/s13045-022-01362-9. PMID: 36209184; PMCID: PMC9548212. (Year: 2022).*
Bianca Altenburg et al. "Chiral Analogues of PFI-1 as BET Inhibitors and Their Functional Role in Myeloid Malignancies" ACS Medicinal Chemistry Leiters, US. vol. 11. No. 10. Oct. 8, 2020 (Oct. 8, 2020). pp. 1928-1934 DOI: 10.1021/acsmedchemlett.9b00625 ISSN: 1948-5875. XP055753461 figures 1-4; examples 4a. 4b. 5. 6. 7.
International Search Report corresponding to Application No. PCT/EP2020/080156 mailed Dec. 4, 2020 and English translation.
German Search Report for corresponding Application No. 10 2019 129 527.0, issued Dec. 4, 2019, no translation available.
Blom, et al. Sulfoximine-Titanium Reagents in Enantioselective Trimethylsilylcyanations of Aldehydes; Acta Chem. Scand. 50: 305-315 © Acta Chemica Scandinavica 1996.
Brandt, et al. An efficient resolution of (+)-S-methyl-S-phenylsulfoximine with (+)-10-camphorsulfonic acid by the method of half-quantities; Tetrahedron: Asymmetry, vol. 8, No. 6, pp. 909-912, 1997;1997 Elsevier Science Ltd.
Candy, et al. Synthesis of Sulfondiimines by N-Chlorosuccinimide-MediatedOxidative Imination of Sulfiliminium Salts; Angew. Chem. 2012, 124, 4516-4519; 2012 Wiley-VCH Verlag Gmbh & Co. KGaA, Weinheim.
Fish, et al. Identification of a Chemical Probe for Bromo and Extra C-Terminal Bromodomain Inhibition through Optimization of a Fragment-Derived Hit; Journal of Medicinal Chemistry 2012 55 (22), 9831-9837 DOI: 10.1021/im3010515.
Izzo, et al. A New, Practical One-Pot Synthesis of Unprotected Sulfonimidamides by Transfer of Electrophilic NH to Sulfinamides; vol. 23, Issue Oct. 2, 606, 2017 pp. 15189-15193.
Picaud, et al. PFI-1—A highly Selective Protein Interaction Inhibitor Targeting BET Bromodomains; Cancer Res. Jun. 1, 2013; 73(11): 3336-3346. DOI:10.1158/0008-5472.CAN-12-3292.
Tota, et al. Synthesis of NH-sulfoximines from sulfides by chemoselective one-pot N- and O-transfers; Chem. Commun., 2017,53, 348; Accepted Dec. 1, 2016,DOI: 10.1039/c6cc08891k.
Zenzola, et al. Transfer of Electrophilic NH Using Convenient Sources of Ammonia: Direct Synthesis of NH Sulfoximines from Sulfoxides; Angew. Chem. 2016, 128, 7319-7323; 2016 Die Autoren. Verçffentlicht von Wiley-VCH Verlag Gmbh & Co. KGaA, Weinheim.
International Preliminary Report on Patentability corresponding to Application No. PCT/EP2020/080156 issued May 3, 2022 and English translation.

* cited by examiner

*Primary Examiner* — Bruck Kifle
*Assistant Examiner* — Kevin S Martin
(74) *Attorney, Agent, or Firm* — Renner, Otto, Boisselle & Sklar, LLP

(57) ABSTRACT

The invention relates to compounds according to the general formula (1), and to the use thereof for production of a medicament, especially for treatment of a disorder associated with bromodomains, such as cancer.

12 Claims, 8 Drawing Sheets

A

B

C

BROMODOMAIN INHIBITORS

Figure 1:
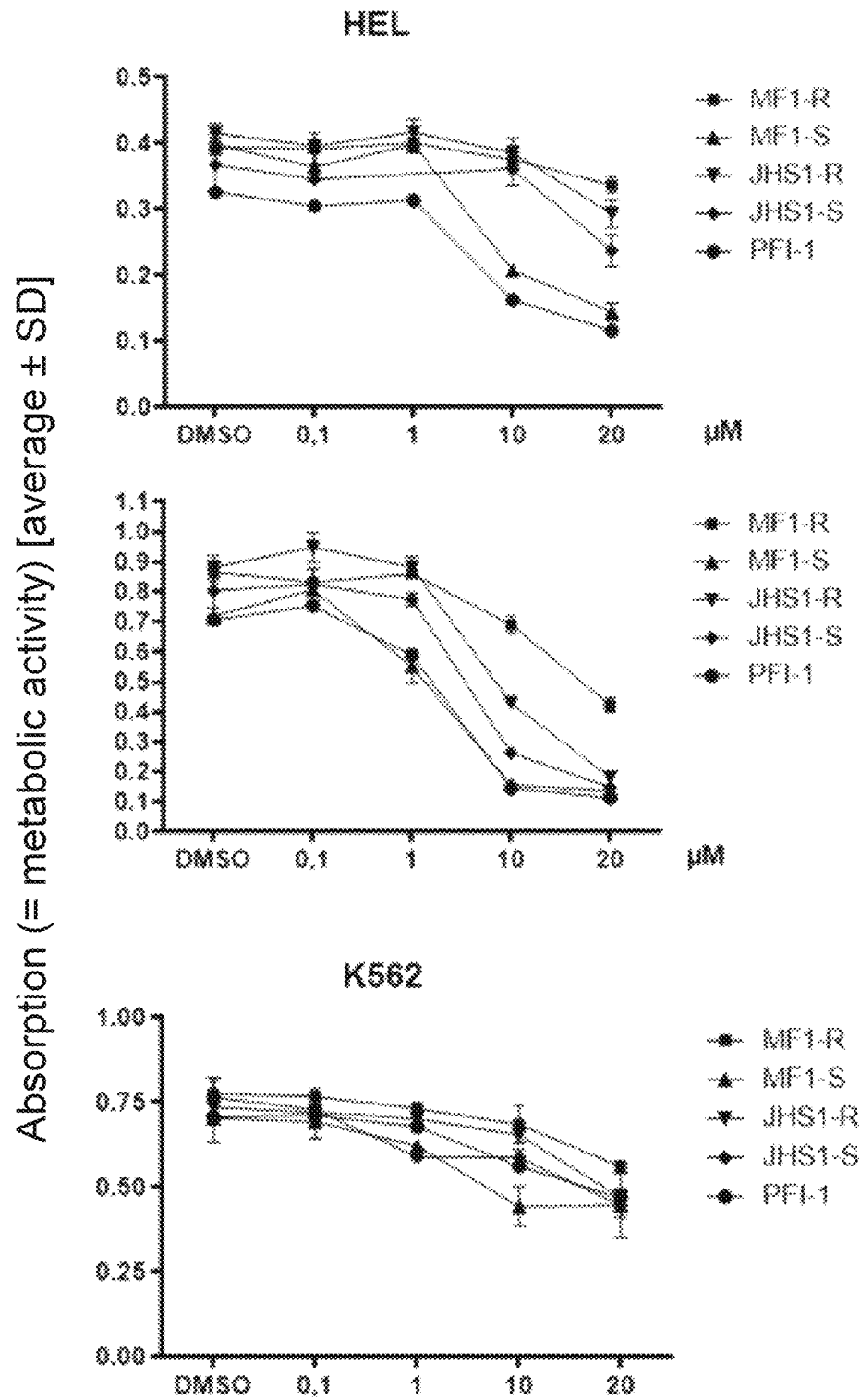

By post-translational modification, histone acetyltransferases (HATs) and histone deacetylases (HDACs) control the acetylation state of lysines in the chromatin. In this way, the expression of genes is regulated positively or negatively. For this process, highly selective acetyllysine-specific protein-protein interactions are important, which are orchestrated by protein interaction modules. These include the bromodomains (BRD), which have a deep hydrophobic acetyllysine binding pocket. Proteins having two BRDs and one extra-terminal domain characterize the bromodomain and extra-terminal domain (BET) family, which includes, for example, BET family proteins BRD2, BRD3, BRD4 and BRDT. BET proteins are important since they regulate normal transcription processes, but in various types of cancer they also determine the transcription of oncogenes such as c-myc and Bc1-2. Selective inhibition of the BET proteins is therefore of great significance for cancer treatments. It has been shown inter alia that BRD4 is a possible therapeutic target in acute myeloid leukaemia (AML) and myeloproliferative neoplasia (MPN).

In 2012 and 2013, Fish et al. (J. Med. Chem. 2012, 55, 9831-9837) and Picaud et al. (Cancer Res. 2013, 73, 3336-3346) reported the identification of a BET inhibitor (PFI-1) that selectively addresses BRD4. The heterocyclic compounds are likewise described in WO 2013/027168 A1. Since then, further, structurally very similar molecules have been described, which likewise interact with bromodomains, but preferentially inhibit representatives of the "plant homeodomain finger-containing" protein family. For example, WO 2011/137089 A1 and WO 2010/042867 A2 describe activators of human pyruvate kinase. Moreover, WO 2010/141074 A2 describes inhibitors of UDP-N-acetylglucosamine-peptide N-acetylglucosaminyltransferase (O-GlcNAc transferase). The compounds are structurally very similar. As well as a heterocyclic fragment on the east side, a secondary sulfonamide group connects the western side of the molecule, to which differently substituted aryls are bonded. Modifications to the compounds concentrate here on variations in the eastern and western halves of the molecules. There is a need for further compounds usable in the treatment of cancer and the development of new medicaments.

It was therefore an object of the present invention to provide novel compounds that are suitable as inhibitors for bromodomains and hence for treatment of cancer.

This object is achieved by the compound according to the general formula (1) as shown below and/or the stereoisomers, tautomers, solvates, hydrates and pharmaceutically acceptable salts thereof:

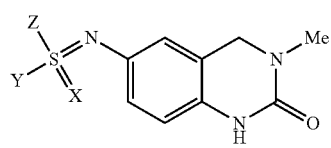

(1)

wherein:

X is selected from O or N—$R^1$ where $R^1$ is selected from the group comprising hydrogen, cyano, $C_{1-6}$-alkyl and/or in each case optionally mono- or poly-$C_{1-6}$-alkyl-substituted $C_{3-7}$-cycloalkyl, aryl or hetaryl;

Y is selected from the group comprising $C_{1-6}$-alkyl, in each case optionally mono- or poly-$C_{1-6}$-alkyl-substituted $C_{3-7}$-cycloalkyl, aryl or hetaryl, $NH_2$, $NHR^2$ and/or $NR^2R^3$, where $R^2$ and $R^3$ are selected from the group comprising $C_{1-6}$-alkyl and/or in each case optionally mono- or poly-$C_{1-2}$-alkyl-substituted $C_{3-7}$-cycloalkyl, aryl or hetaryl;

Z is selected from cyclohexyl, aryl or hetaryl, in each case unsubstituted or mono- or polysubstituted by $C_{1-6}$-alkyl, $C_{1-5}$-alkoxy or mono- or poly-halogen-substituted $C_{1-6}$-alkyl; and Me is methyl.

It has been found that the compounds show marked inhibitory activity in various haematopoietic cell lines. This is unexpected especially since there are significant structural differences in the central functional unit compared to the known BET inhibitor PFI-1, and particularly changes in central functional groups such as the sulfonamide group of PFI-1 typically result in a loss of activity. Variation of the substituents on the nitrogen atoms of the sulfonediimide or of the sulfonimide amide group or variation of the alkyl group of the sulfoximine or sulfonediimide group permits optimization and adjustment of selectivity. No such variations are possible in the case of sulfonamide structures.

More particularly, the sulfoximine, sulfonimide amide and sulfonediimide group opens up the utilization of the stereochemistry on the central sulfur atom. Sulfoximine, sulfonimide amide and sulfonediimide groups, with this sulfur atom, have a stereocentre on which the substituents cannot change their relative position, and hence various spatial arrangements are possible. The compounds of the formula (1) may therefore exist in the form of the racemates, diastereomers or enantiomer pairs.

The stereoisomers may be obtained by conventional methods, for example by means of high-performance liquid chromatography (HPLC), optical resolution or asymmetric synthesis. The stereoisomeric compounds may differ in relation to their inhibitory activity. For example, it has been shown that the (S) enantiomer of a sulfoximine showed higher inhibitory action compared to PFI-1 on the growth and viability of leukaemia cell lines.

In addition, sulfonimide amides, compounds in which the substituent Y is selected from $NH_2$, $NHR^2$ or $NR^2R^3$, may also exist in the form of their tautomers.

The term "$C_{1-6}$-alkyl", unless stated otherwise, encompasses straight-chain or branched alkyl groups having 1 to 6 carbon atoms, especially selected from methyl, ethyl, propyl, isopropyl, butyl, tert-butyl, isobutyl, pentyl, isopentyl, neopentyl, hexyl and isohexyl.

$C_{3-7}$-Cycloalkyl groups are preferably selected from the group comprising cyclopropyl, cyclopentyl and/or cyclohexyl.

$C_{1-5}$-Alkoxy groups are preferably selected from the group comprising methoxy, ethoxy, linear or branched propoxy and/or butoxy.

The term "aryl" is understood to mean aromatic radicals having 6 to 10 carbon atoms. The term "aryl" preferably encompasses carbocycles, especially phenyl.

The term "hetaryl" is understood to mean mono- or bicyclic heteroaryl groups comprising one, two, three or four heteroatoms selected from the group comprising N, O and/or S. Preferred heteroaryl groups are monocyclic heteroaryl groups, especially $C_{5-6}$-heteroaryls. Preferred monocyclic heteroaryl groups have a heteroatom selected from N, O or S. Preferred heteroaryl groups are selected from the group comprising pyridyl and/or pyrimidyl, preference being given to pyridyl.

The term "halogen" encompasses fluorine, chlorine, bromine and iodine, preference being given to fluorine or chlorine.

The term "salt" in the context of the present invention is understood to mean forms of the compound in which it assumes an ionic form or is charged and is present with cations or anions as counterion or is present in solution. More particularly, pharmaceutically acceptable salts in the context of this invention are understood to mean salts formed with a physiologically compatible inorganic or organic base that are physiologically compatible especially when used in humans. Pharmaceutically acceptable salts of the compounds according to the invention are selected, for example, from the group comprising sodium, potassium and/or lithium salts. The term "salt" in the context of the present invention is especially also understood to mean pharmaceutically acceptable addition salts, especially base addition salts, for example salts of the compounds with inorganic bases such as alkali metal or alkaline earth metal hydroxides.

A preferred group of compounds is sulfoximines. In these compounds, the substituent X is oxygen. In embodiments of the compound (1), the substituents are as follows:
X is oxygen;
Y is selected from the group comprising $C_{1-6}$-alkyl and/or in each case optionally mono- or poly-$C_{1-2}$-alkyl-substituted $C_{3-7}$-cycloalkyl, aryl or hetaryl; and
Z is selected from cyclohexyl, aryl or hetaryl, each unsubstituted or mono- or polysubstituted by $C_{1-6}$-alkyl, $C_{1-5}$-alkoxy or mono- or poly-halogen-substituted $C_{1-6}$-alkyl.

In preferred embodiments of the compound (1), the substituents are as follows:
X is oxygen;
Y is selected from the group comprising $C_{1-5}$-alkyl and/or in each case optionally mono- or poly-$C_{1-2}$-alkyl-substituted $C_{5-6}$-cycloalkyl or phenyl, preferably selected from $C_{1-3}$-alkyl, especially methyl or ethyl; and
Z is selected from cyclohexyl or phenyl, in each case unsubstituted or mono- or polysubstituted by $C_{1-3}$-alkoxy, especially cyclohexyl or phenyl, each unsubstituted or monosubstituted by methoxy. The substitution here is preferably in the ortho position.

In preferred embodiments, the compound is selected from the group comprising the compounds of the following formulae (MF1), (MF2), (MF3) or (MF4):

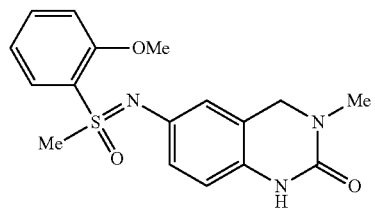

(MF1)

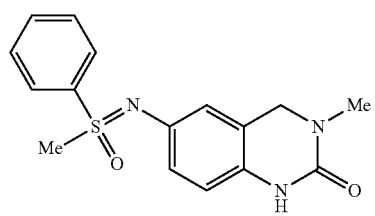

(MF2)

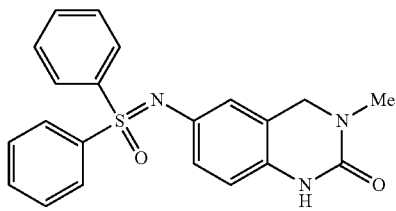

(MF3)

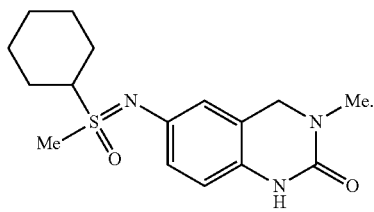

(MF4)

The compounds MF1, MF2 and MF3 showed marked inhibitory activity in various haematopoietic cell lines, especially erythroleukaemia cell lines and acute myeloid leukaemia (AML) cell lines. More particularly, it was possible to show activity of the respective racemic mixtures of the compounds MF1, MF2 and of the achiral compound MF3 that was at a comparable level to PFI-1.

In preferred embodiments, the compound is the (S) enantiomer of the compounds of the formulae (MF1) or (MF2). In particularly preferred embodiments, the compound is the (S) enantiomer of the compound of the formula (MF2). This has the following formula (MF2-S):

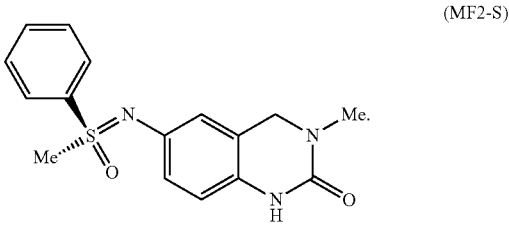

(MF2-S)

The (S) enantiomer of the compound of the formula (MF2) MF2-S showed excellent inhibition of the cell proliferation of haematopoietic cell lines. For instance, MF2-S in a concentration of 1 µM was able to achieve significantly greater reduction in the metabolic activity of the erythroleukaemia cell line HEL (JAK2V617F positive) and of the AML line Molm-14 (FLT3-ITD positive) than the known BET inhibitor PFI-1. The (S) enantiomer of the compound of the formula (MF2) also showed better efficacy in the inhibition of cell division and the induction of cell death in the HEL and AML cell lines. It is thus possible, in the form of MF2-S, to provide a compound having improved efficiency compared to PFI-1. It is also particularly advantageous that the (S) enantiomer of the compound of the formula (MF2) showed better inhibition of cell growth than PFI-1 in human samples from AML patients.

The compound may also be the (R) enantiomer of the compound of the formula (MF2), corresponding to the compound of the following formula (MF2-R):

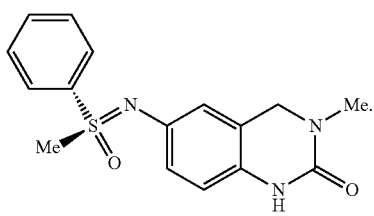

(MF2-R)

MF2-R showed inhibition of the cell proliferation of leukaemia cell lines, while MF2-S had higher efficiency.

In further embodiments of the sulfoximines, the substituent Z, especially cyclohexyl or phenyl, may in each case be monosubstituted by methoxy. The substitution here is preferably in ortho position. The sulfoximine may have a structure according to the following formula (MF1):

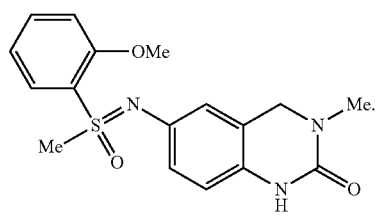

(MF1)

The racemic mixture of the compound (MF1) likewise showed inhibitory activity in the haematopoietic cell lines, especially erythroleukaemia cell lines and acute myeloid leukaemia (AML) cell lines.

The compound is preferably the (S) enantiomer of the compound of the formula (MF1). This has the following formula (MF1-S):

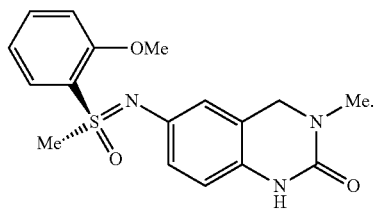

(MF1-S)

The (S) enantiomer MF1-S showed a comparable effect on the metabolic activity of the haematopoietic cell lines of HEL and Molm-14 cells to PFI-1.

The compound may also be the (R) enantiomer of the compound of the formula (MF1). This has the following formula (MF1-R):

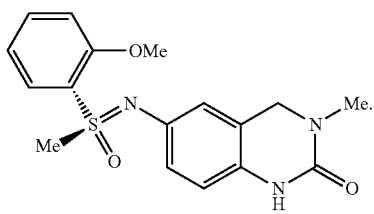

(MF1-R)

The (R) enantiomer MF1-R showed a minor inhibitory effect in haematopoietic cell lines.

In preferred embodiments, the compound of one of the enantiomers of the compound of the formula (MF4) is selected from (+)-N-(3-methyl-2-oxo-1,2,3,4-tetrahydroquinazolin-6-yl)-S-cyclohexyl-S-methylsulfoximine and (−)-N-(3-methyl-2-oxo-1,2,3,4-tetrahydroquinazolin-6-yl)-S-cyclohexyl-S-methylsulfoximine.

A further preferred group of compounds is that of sulfonediimides. In these compounds, the substituent X is an N—$R^1$ group. In these embodiments of the compound (1), the substituents are as follows:

X is N—$R^1$ where $R^1$ is selected from the group comprising hydrogen, cyano, $C_{1-6}$-alkyl and/or in each case optionally mono- or poly-$C_{1-2}$-alkyl-substituted $C_{3-7}$-cycloalkyl, aryl or hetaryl;

Y is selected from the group comprising $C_{1-6}$-alkyl and/or in each case optionally mono- or poly-$C_{1-2}$-alkyl-substituted $C_{3-7}$-cycloalkyl, aryl or hetaryl; and Z is selected from cyclohexyl, aryl or hetaryl, each unsubstituted or mono- or polysubstituted by $C_{1-6}$-alkyl, $C_{1-5}$-alkoxy or mono- or poly-halogen-substituted $C_{1-6}$-alkyl.

In preferred embodiments of the compound (1), the substituents are as follows:

X is N—$R^1$ where $R^1$ is selected from the group comprising hydrogen, $C_{1-5}$-alkyl or aryl, especially methyl or phenyl or hydrogen;

Y is selected from the group comprising $C_{1-5}$-alkyl and/or in each case optionally mono- or poly-$C_{1-2}$-alkyl-substituted $C_{5-6}$-cycloalkyl or phenyl, preferably selected from $C_{1-3}$-alkyl, especially methyl; and Z is selected from aryl, especially phenyl.

In preferred embodiments, the compound is selected from the group comprising the compounds of the following formulae (JHS1), (JHS2) or (JHS3) or is one of the stereoisomers thereof:

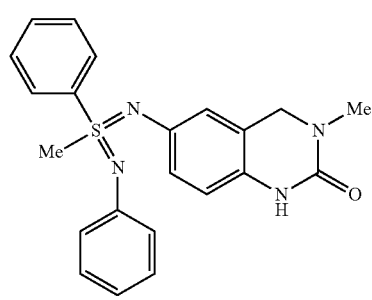

(JHS1)

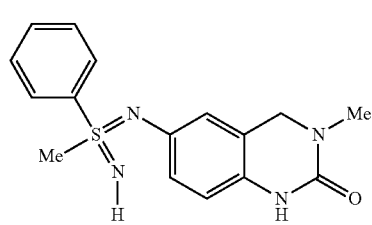

(JHS2)

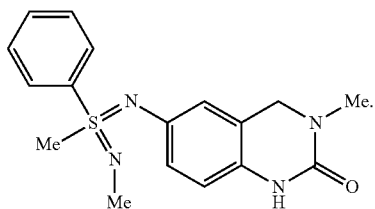

(JHS3)

The compound (JHS1) likewise showed inhibitory activity in the haematopoietic cell lines, especially erythroleukaemia cell lines and acute myeloid leukaemia (AML) cell lines. For instance, JHS1 achieved inhibition of the metabolic activity of HEL and Molm-14 cells at concentrations of 10 and 20 μM.

In further-preferred embodiments, the compound is the (S) enantiomer of the compound of the formula (JHS1). This has the following formula (JHS1-S):

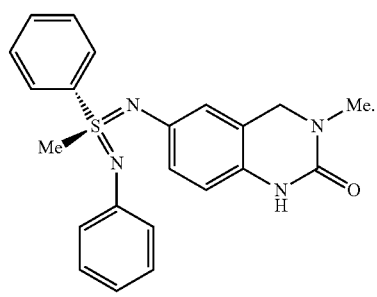

(JHS1-S)

The (S) enantiomer JHS1-S showed a comparable effect on the metabolic activity of the haematopoietic cell lines of HEL and Molm-14 cells to PFI-1.

Also preferred is the (R) enantiomer of the compound of the formula (JHS1). This has the following formula (JHS1-R):

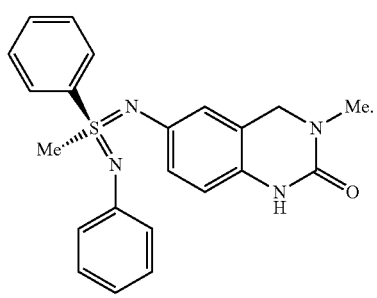

(JHS1-R)

The (R) enantiomer JHS1-R showed almost the same level of inhibitory action in haematopoietic cell lines to the (S) enantiomer JHS1-S.

Further sulfonediimides may be selected from the compounds according to the formulae (JHS2) and (JHS3). These compounds showed minor inhibitory activity in the leukaemia cell lines examined.

A further preferred group of compounds is that of sulfonimide amides and tautomers thereof. In these compounds, the substituent Y is an amino group $NH_2$, $NHR^2$ or $NR^2R^3$. In these embodiments of the compound (1), the substituents are as follows:

X is oxygen;
Y is selected from the group comprising $NH_2$, $NHR^2$ and/or $NR^2R^3$, where $R^2$ and $R^3$ are selected from the group comprising $C_{1-6}$-alkyl and/or in each case optionally mono- or poly-$C_{1-2}$-alkyl-substituted $C_{3-7}$-cycloalkyl, aryl or hetaryl; and
Z is selected from cyclohexyl, aryl or hetaryl, each unsubstituted or mono- or polysubstituted by $C_{1-6}$-alkyl, $C_{1-5}$-alkoxy or mono- or poly-halogen-substituted $C_{1-6}$-alkyl.

In preferred embodiments of the compound (1), the substituents are as follows:
X is oxygen;
Y is selected from $NH_2$, $NHR^2$ and/or $NR^2R^3$, where $R^2$ and/or $R^3$ is selected from the group comprising $C_{1-6}$-alkyl and/or in each case optionally mono- or poly-$C_{1-2}$-alkyl-substituted $C_{3-7}$-cycloalkyl, aryl or hetaryl; in particular, $NR^2R^3$ is piperidyl.
Z is selected from cyclohexyl or phenyl, in each case unsubstituted or mono- or polysubstituted by $C_{1-3}$-alkoxy, especially phenyl.

In preferred embodiments, the compound is selected from the group comprising the compound according to the following formula (JHS4) or one of the enantiomers thereof:

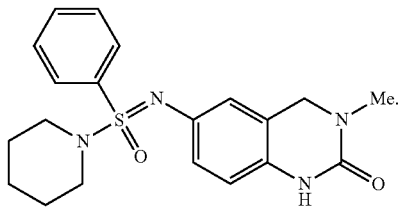

(JHS4)

The compounds, being inhibitors of the bromodomains, especially of the protein family of the BET proteins, e.g. BRD2-4, which influence the initiation and elongation of gene transcription and cell growth, are suitable for treatment of disorders associated with bromodomains. These include autoimmune disorders, inflammatory disorders and cancer. Use of the compounds in the treatment of autoimmune disorders, inflammatory disorders and cancer, especially cancerous cell growth mediated by BET proteins, is therefore a further aspect of the present invention. The term "cancer" in the context of the present invention is generally understood to mean malignant disorders characterized by uncontrolled replication of altered cells.

The invention further relates to use of the compounds for production of a medicament, especially for production of a medicament for treatment of a disorder associated with bromodomains. Disorders associated with bromodomains are preferably selected from autoimmune disorders, inflammatory disorders and cancer, especially acute myeloid leukaemia or myeloproliferative neoplasia. The invention correspondingly relates to a compound according to the invention for use as medicament, especially for use in the treatment of a disorder associated with bromodomains, preferably of autoimmune disorders, inflammatory disorders and cancer, especially acute myeloid leukaemia or myeloproliferative neoplasia.

Cancers are especially bone marrow disorders or leukaemia ("blood cancer"). Leukaemia refers to malignant disorders that usually originate in the bone marrow or haematopoietic stem cells and which can usually first be detected in the blood. It is likewise possible here to distinguish between acute and chronic leukaemia. Examples of these bone marrow disorders are acute lymphatic leukaemia (ALL) and chronic lymphatic leukaemia (CLL), which influence the lymphatic cells, and acute myeloid leukaemia (AML) or myelodysplastic syndrome (MDS). The term "myeloproliferative neoplasia" (MPN) encompasses a group of rare malignant disorders of the bone marrow in which too many red blood cells, white blood cells and/or blood platelets are formed. The MPNs include Philadelphia chromosome-positive chronic myeloid leukaemia (CML) and Philadelphia chromosome-negative polycythaemia vera (PV), essential thrombocythaemia (ET) and primary myelofibrosis (PMF); PV and ET can result in myelofibrosis that drastically worsens the clinical picture. Less commonly, MPN can develop into acute leukaemia. In different forms of leukaemia and myeloproliferative disorders, BET proteins have been identified as possible therapy targets, both of individual therapies and combination therapies.

The treatment may include a therapeutic and/or prophylactic treatment. Preference is given to a treatment of a disorder associated with bromodomains in a mammal.

For the description of the compounds, especially according to the general formula (1), reference is made to the details above. A preferred group of compounds is that of sulfoximines, preferably the compounds of the formula (MF2), especially the (S) enantiomers of the formulae (MF2-S), or of the formula (MF1), especially the (S) enantiomer of the formula (MF1-S). A further preferred group of compounds is that of sulfonediimides, preferably the compound of the formula (JHS1), especially the (S) enantiomer of the formula (JHS1-S) or the (R) enantiomer of the formula (JHS1-R). A further preferred group of compounds is that of sulfonimide amides in which the substituent Y is an amino group $NH_2$, $NHR^2$ or $NR^2R^3$ or the tautomeric form thereof, preferably the compounds according to the formula (JHS4).

The invention further relates to a pharmaceutical composition or to a medicament comprising at least one compound according to the invention, especially for use in the treatment of a disorder associated with bromodomains, preferably of cancer, especially of acute myeloid leukaemia or myeloproliferative neoplasia.

It has been found that the compounds according to the general formula (1) show marked inhibitory activity in various haematopoietic cell lines. These effects permit use of the compounds in medicaments for treatment of disorders associated with bromodomains, preferably of autoimmune disorders, inflammatory disorders and cancer, especially of acute myeloid leukaemia or myeloproliferative neoplasia. For description of the disorders, reference is made to the details above.

For the description of the compounds, especially according to the general formula (1), reference is made to the details above. The pharmaceutical composition or medicament preferably contains a sulfoximine, preferably the compounds according to the formula (MF2), especially the (S) enantiomers of the formulae (MF2-S), or of the formula (MF1), especially the (S) enantiomer of the formula (MF1-S). Further preferably, the pharmaceutical composition or medicament contains a sulfonediimide, preferably the compound of the formula (JHS1), especially the (S) enantiomer of the formula (JHS1-S) or the (R) enantiomer of the formula (JHS1-R). Further preferably, the pharmaceutical composition or medicament contains a sulfonimide amide in which the substituent Y is an amino group $NH_2$, $NHR^2$ or $NR^2R^3$, or tautomeric form thereof, preferably the compounds according to the formula (JHS4).

The composition or medicament may, as well as the compound as active ingredient, further comprise pharmaceutically acceptable excipients and/or vehicles. The type of additives, vehicles and/or auxiliaries depends on the desired mode of administration. Oral compositions may take the form, for example, of a tablet, film tablet or capsule, including in delayed release form, and may include customary excipients, such as binders, fillers, lubricants, disintegrants such as starch, or wetting agents. A tablet is preferably soluble in water. Oral liquid preparations may take the form of aqueous or oily suspensions, solutions, emulsions, syrups, elixirs or sprays. Vehicle substances usable are, for example, organic or inorganic substances that are suitable for enteral, for example oral or rectal, or parenteral administration and do not react with the compounds, for example water, vegetable oils, benzyl alcohols, polyethylene glycols, glycerol triacetate and other fatty acid glycerides, gelatin, soya lecithin, carbohydrates such as lactose or starch, magnesium stearate, talc or cellulose.

The medicament or composition may take the form of, and/or be administered in the form of, a liquid, semisolid or solid dosage form, for example of injection solutions, drops, juices, syrups, sprays, suspensions, tablets, capsules, or of pellets or granules. Preferentially suitable for oral administration are formulations in the form of tablets, coated tablets, capsules or granules. The medicament or composition may be sterilized. The composition or medicament may be administrable by an oral, rectal, pulmonary, enteral and/or parenteral route.

Unless stated otherwise, the technical and scientific expressions used have the meaning as commonly understood by a person of average skill in the art in the field to which this invention belongs.

Examples and figures that serve to illustrate the present invention are specified below.

The figures show:

FIG. 1 metabolic activity, which indicates viability, after incubation over 72 h with the compounds MF1-R, MF1-S, JHS1-R and JHS1-S in the specified concentration for HEL, Molm-14 and K562 cells in the respective FIGS. 1A-C. Standard deviations (SD) are shown.

Figure 2:
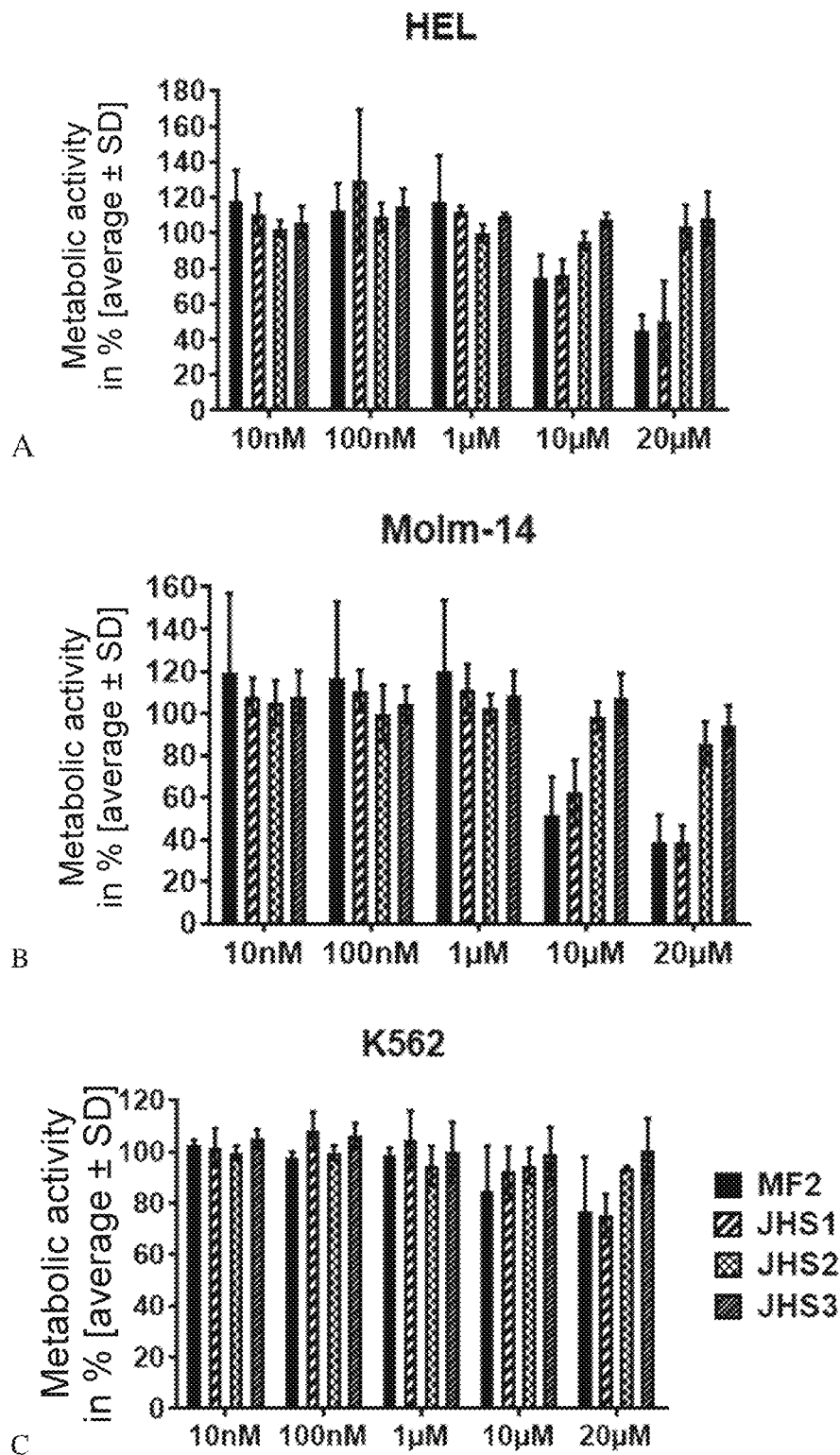

FIG. 2 metabolic activity after incubation over 72 h with the compounds JHS1, JHS2, MF2 and JHS3 (FIG. 2A) in the specified concentration for HEL, Molm-14 and K562 cells in the respective FIGS. 2A-C. Standard deviations are shown.

Figure 3:
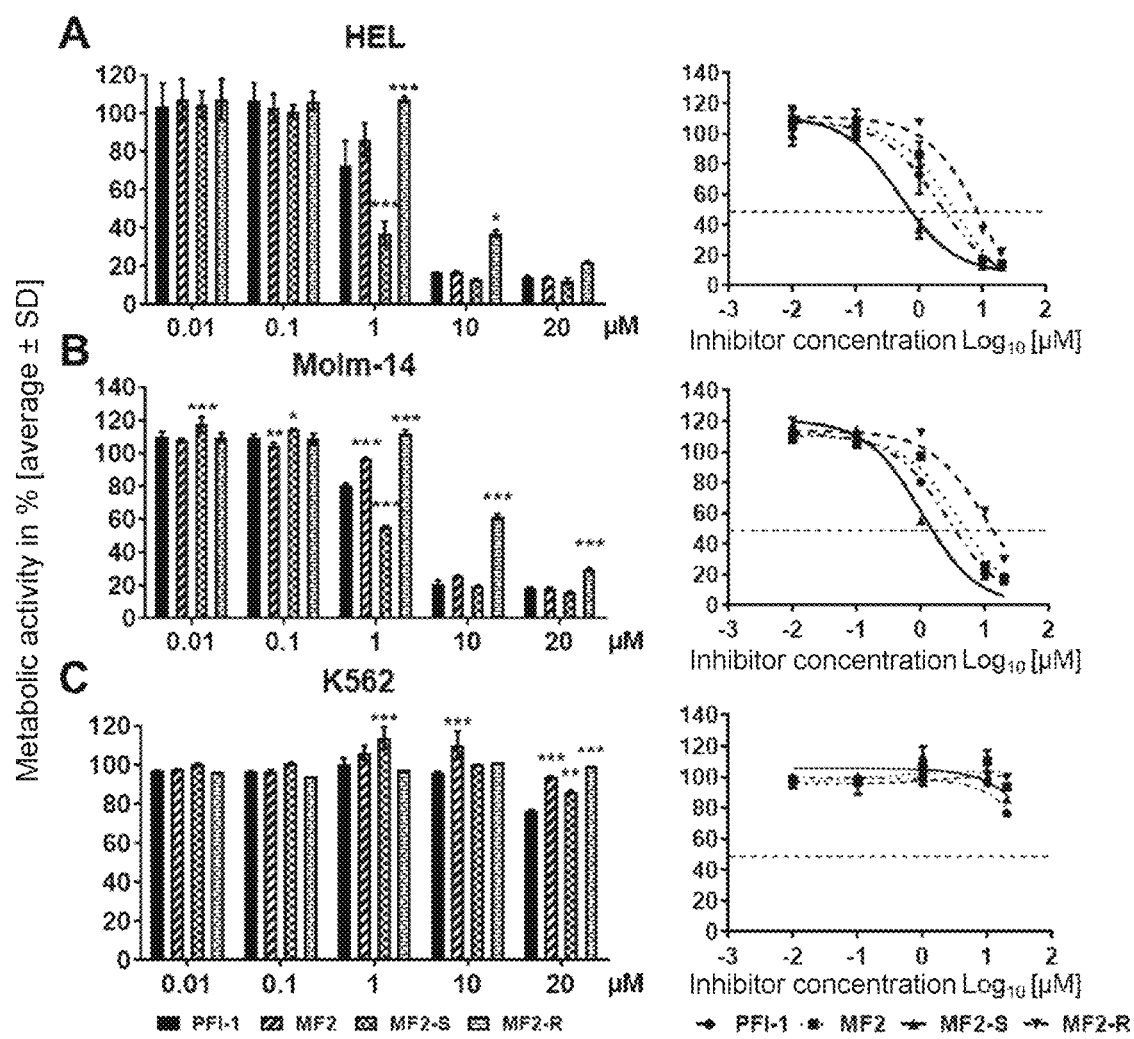

FIG. 3 metabolic activities after incubation over 72 h with the compounds PFI-1, MF2, MF2-S and MF2-R in the specified concentrations for HEL, Molm-14 and K562 cells in the respective FIGS. 3A-C.

Figure 4:
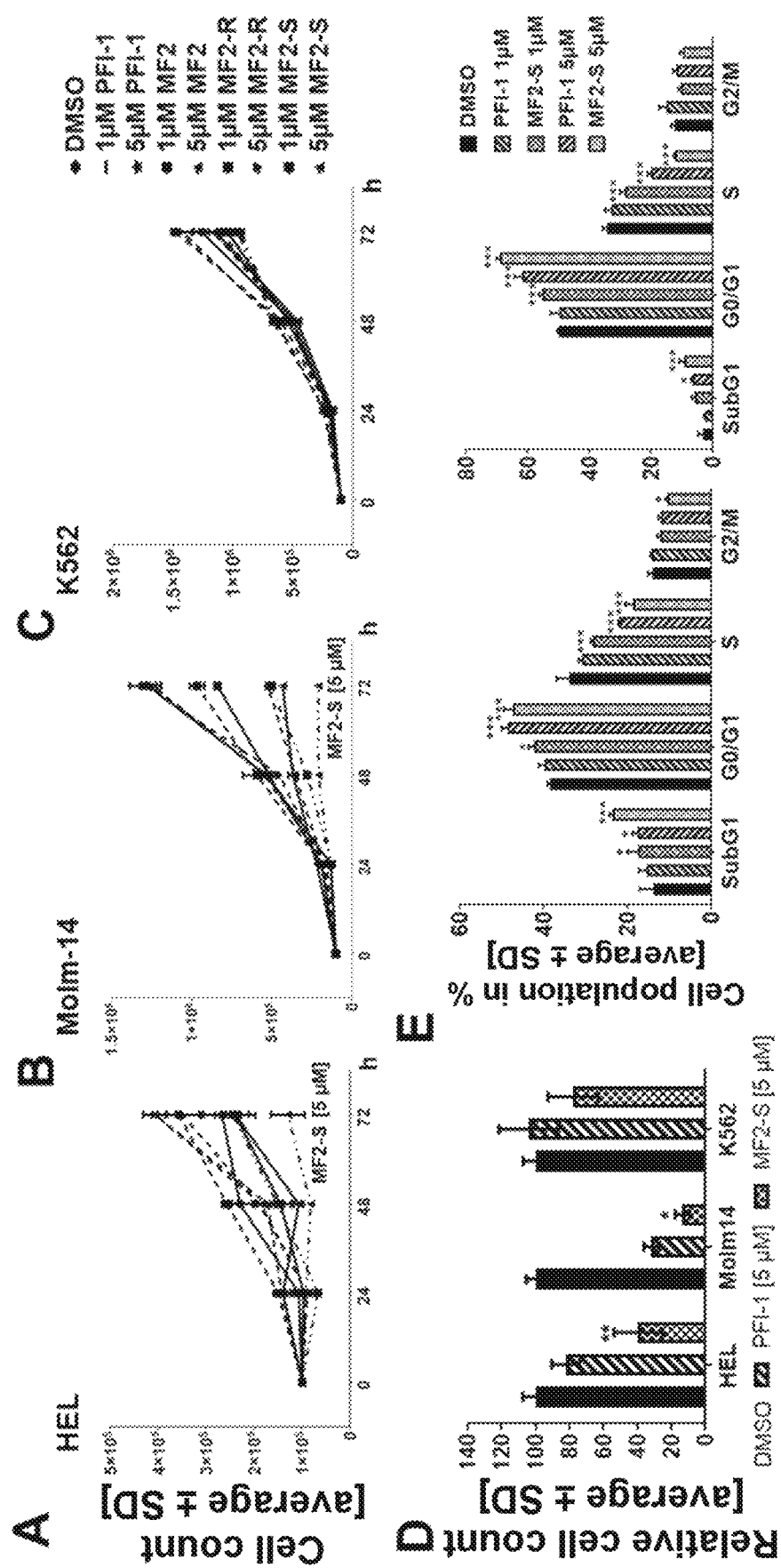

FIG. 4 average cell counts during incubation with the compounds PFI-1, MF2, MF2-S and MF2-R for HEL, Molm-14 and K562 cells in the respective FIGS. 4A-C, relative viability in FIG. 4D after incubation for 72 h, and in FIG. 4E the cell cycle analysis.

Figure 5:
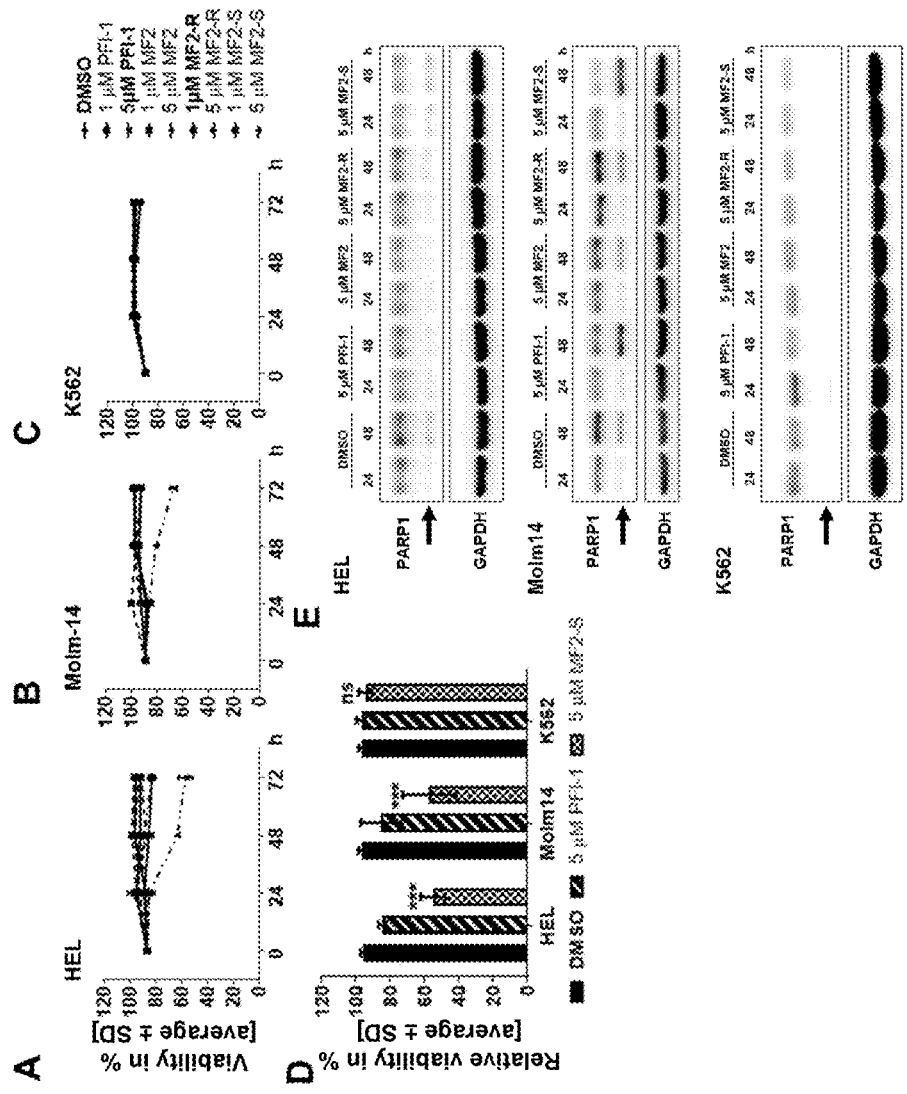

FIG. 5 viability after incubation with the compounds PFI-1, MF2, MF2-S and MF2-R for HEL, Molm-14 and K562 cells in FIGS. 5A-C, relative viability in FIG. 5D after incubation for 72 h, and in FIG. 5E Western blots of the cell lysates.

Figure 6:
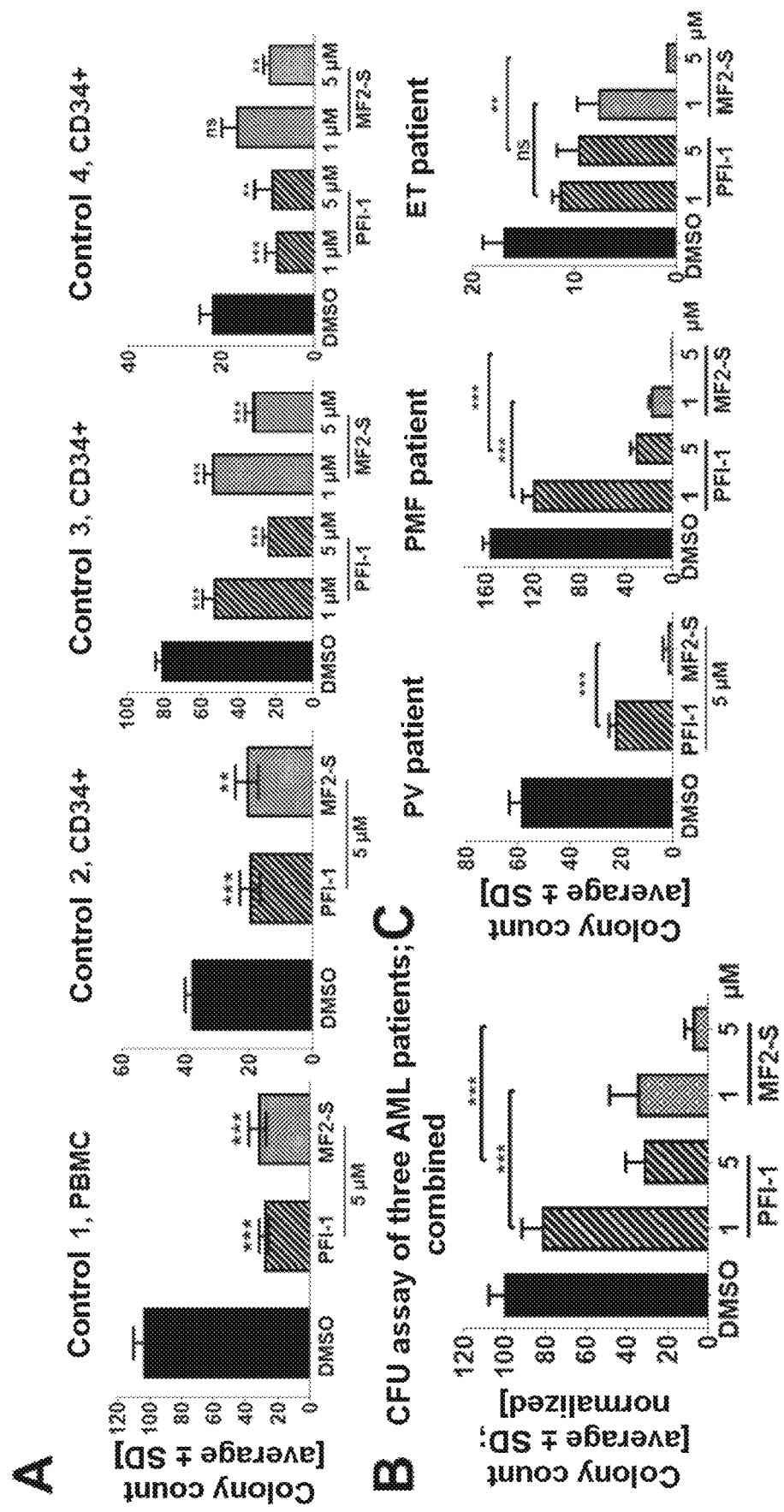

FIG. 6 the colony count in colony-forming assays (CFU assays) with peripheral blood mononuclear cells (PBMC) or CD34+ cells from healthy donors treated with 5 μM PFI-1 or MF2-S in FIG. 6A, FIG. 6B shows the results of the CFU assays of 3 AML patients, and FIG. 6C the results of the CFU assays with mononuclear cells from three MPN patients (PV, PMF, ET).

Figure 7:
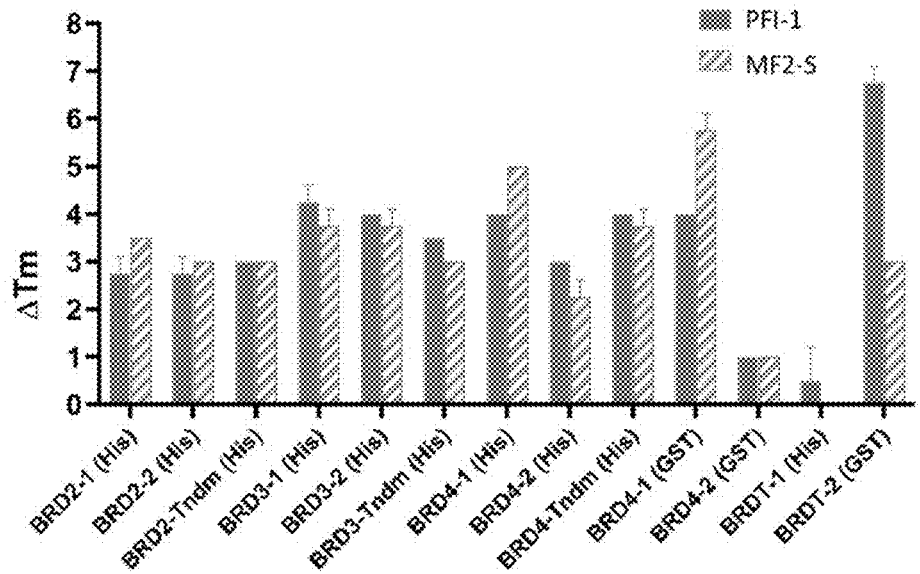
Figure 7:
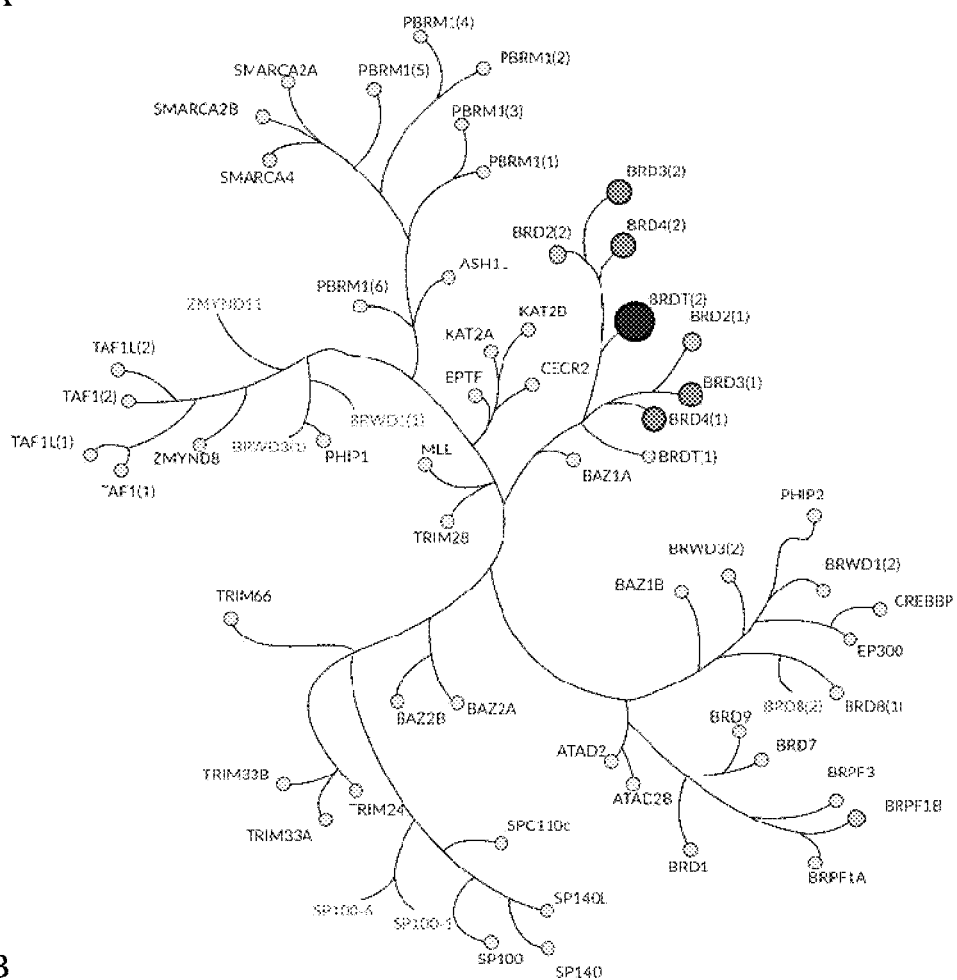
Figure 7:
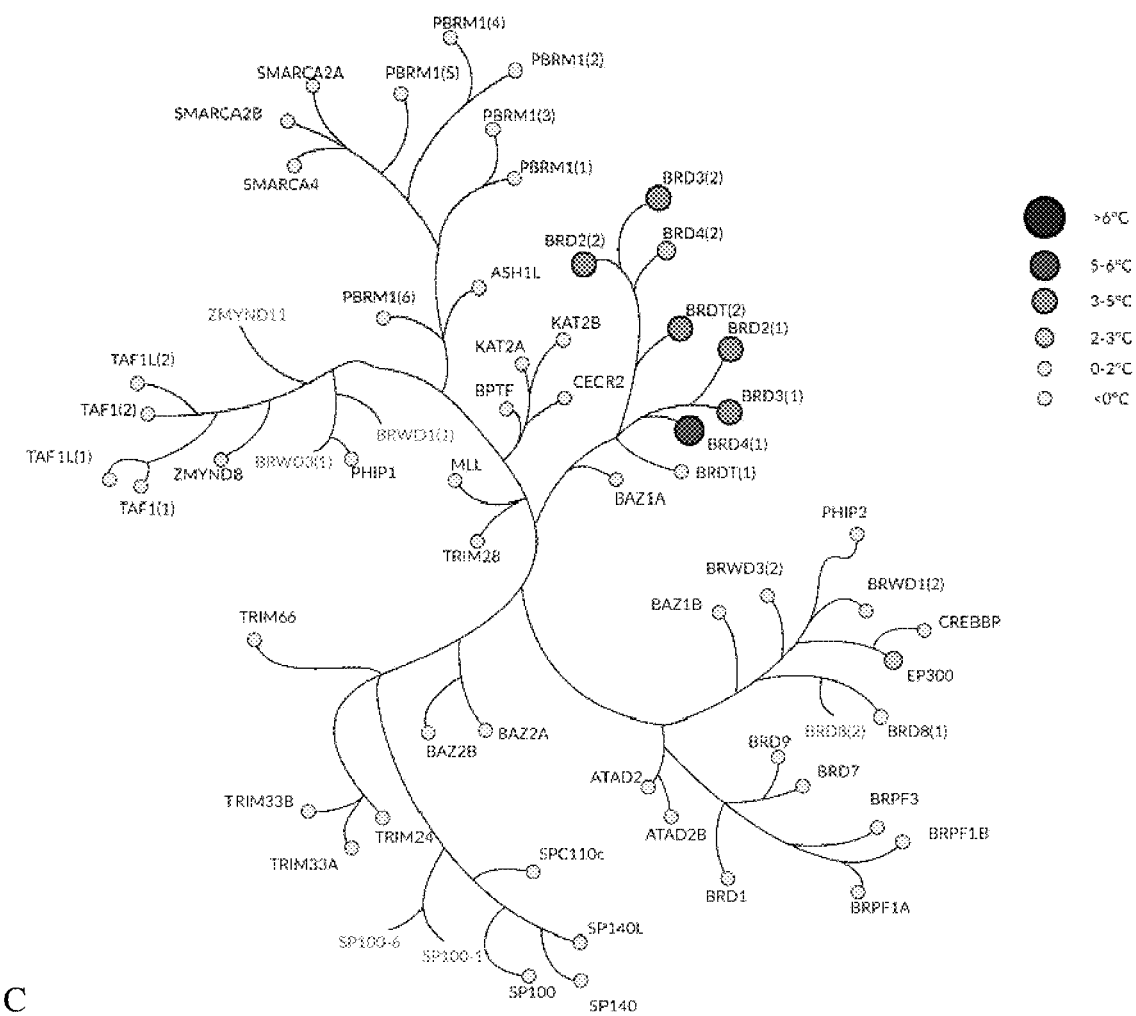

FIG. 7 the selectivity of the compound MF2-S and of the comparative compound PFI-1 with reference to the ΔTm values obtained by a thermal shift assay in FIG. 7A. FIG. 7B shows the specificity of bromodomain-containing proteins for the comparative compound PFI-1, FIG. 7C for the compound MF2-S.

METHODS

Patient Material

Peripheral blood and bone marrow from patients was provided by the Klinik für Hämatologie, Onkologie, Hamostaseologie and Stammzelltransplantation (Med. Klinik IV) (EK 127/12) and the centralized biomaterial bank, Universitätsklinikum Aachen. The healthy controls were provided by the Institut für Transfusionsmedizin (EK099/149), Universitätsklinikum Aachen. All donors/patients gave a written declaration of consent.

Cell Culture

All studies with the HEL, Molm-14 and K562 cell lines mentioned (sourced from DSMZ: ACC-11, ACC-10 and ACC-777) were conducted under germ-free conditions under a sterile hood. Incubation was effected at 37° C. in an incubator at a CO2 saturation of 5%. For the passage of the suspension cells, the cells were transferred in a Falcon prefilled with PBS (phosphate buffered saline) and centrifuged at 1200 rpm for 5 min. All three cell lines were cultured in RPMI-1640 medium (Gibco, Thermo Fischer Scientific, Darmstadt, Germany) with 10% FCS and 1% penicillin streptomycin.

Determination of Cell Count and Proliferation Assay

Cell count and viability was determined after trypan blue staining. The appropriate concentrations of the inhibitors per ml of medium were added, or the correspondingly highest volume of DMSO was added as control group.

MTT Assay

The viability and metabolic activity of the cells were measured by the MTT assay. Yellow, water-soluble MTT (3-(3,5-dimethylthiazol-2-yl)-2,5-diphenyltetrazolium bromide) is a tetrazolium salt which is reduced to dark blue formazan in living cells. Insoluble formazan is released by addition of isopropanol-HCl, and its intensity can be determined by photometry at a wavelength of 550 nm. Thus, the proportion of living cells is measured by comparison with a particular control sample. The cells were counted and washed with PBS, and 30 000 cells per well were sown in triplicates in a 96-well plate. For the inhibitor treatment, the stated final concentrations were used. For this purpose, 10 μl of the appropriate inhibitor dilution was introduced into the 96-well plates, and then 90 μl of cell suspension was pipetted in. The plates were incubated in an incubator for 72 h (37° C., 5% $CO_2$). After the incubation, 10 μl of MTT solution (5 mg/ml) was applied to the wells with a multichannel pipette and thoroughly resuspended. This was followed by incubation for 4 h in the dark at room temperature. Subsequently, the cells were resuspended in 100 μl of isopropanol-HCl and lysed, and absorption at a wavelength of 550 nm was measured by photometry with a plate reader (Kayto, RT-2100C).

Cell Cycle Analysis

The influence of the inhibitors used on the cell cycle was examined by means of propidium iodide staining of the fixed cells. For this purpose, the cells were fixed with 95% ethanol at −20° C., RNA was destroyed by RNase (100 μg/ml) at 37° C. for 15 mM, and the DNA was stained by means of propidium iodide (50 μg/ml). Using a flow cytometer (Gallios (Beckman Coulter, Krefeld, Germany)), the cell cycle phases were analysed, and the data were evaluated by means of FlowJo Software (Version 10).

SDS-Page and Western Blot

Cell lysates were produced with RIPA lysis buffer (50 mM Tris pH 7.4, 150 mM sodium chloride, 1 mM EDTA, 1% Triton-X, 15% glycerol, 0.5% sodium deoxycholate, and protease/phosphatase inhibitors). Protein concentrations were determined by the Bradford Protein Assay using a Nanodrop Spectrometer (NanoDrop 2000/2000c system, Thermo Fisher Scientific, Darmstadt, Germany) at 595 nm. To 25 μg of protein lysates was added 4xLämmli sample buffer, followed by denaturing at 65° C. for 5 min and introduction into the SDS-Page. The proteins were transferred by the wet blot method in Towbin buffer (3 g Tris, 14.4 g glycine, 5% methanol per litre of ddH2O) to a PVDF membrane at 100 mA overnight. The membrane was blocked with 10% BSA in TBS-T buffer (20 mM Tris-HCl, pH 7.6, 137 mM NaCl, 0.05% IGEPAL). The primary antibodies were incubated at 4° C. overnight, and the HRP-labelled antibodies at room temperature with the membrane for 45 mM. The proteins were detected by means of PCA-ECL solution using a chemiluminescence detector (Fusion SL, PeqLab).

CFU Assay

With the aid of the CFU assay, it is possible to determine the colony-forming capacity of individual cells in a semi-solid methylcellulose medium (MethoCult H4434, StemCell Technologies, Cologne, Germany). The number of colonies was determined after 7-11 days.

Different cell counts were used:

Mononuclear cells from the bone marrow from AML patients: $7 \times 10^5$ cells/ml PBMCs from PV, ET or PMF patients: $4 \times 10^5$ cells/ml CD34+ cells (G-CSF mobilized from stem cell donors) from healthy donors: $2 \times 10^4$ cells/ml; PBMCs from the healthy subjects: $4 \times 10^5$ cells/ml.

Vital sterile mononuclear bone marrow cells from AML patients were cultured for 24 h in 1.5 ml of BIT Medium in 8.5 ml of IMDM medium (to which had been added 5 μl of FLT3 ligand, 10 μl of rh SCF, 2 μl of rh IL-3, 2 μl of rh G-CSF, 50 μl of ciprofloxacin and 6.99 μl of β-mercaptoethanol in 1:100 dilution), before they were used in the CFU assay.

Melting Points (m.p.)

Melting points were ascertained in open capillaries in a metal heating block with digital thermometer.

Nuclear Spin Resonance (NMR) Data

NMR analyses were effected for the nuclei $^1$H and $^{13}$C at the measurement frequencies of 600 MHz or 400 MHz ($^1$H) or 151 MHz or 101 MHz ($^{13}$C) in deuterated solvents, for example chloroform, dichloromethane or dimethyl sulfoxide. $^{13}$C NMR spectra, without exception, were measured with $^1$H broadband decoupling.

Infrared Spectroscopy (IR) Data

Sample analysis was effected with attenuated total reflection (ATR).

Mass Spectrometry (MS) Data

Data were obtained by electron impact ionization (EI), chemical ionization (CI) or electrospray ionization (ESI).

Polarimetry

The measurements were conducted at room temperature with monochromatic radiation of wavelength λ=589 nm in a cuvette of length d=1 dm. The specific rotations $[\alpha]_D$ bear the unit deg cm$^3$ dm$^{-1}$ g$^{-1}$. The concentration c was reported with the unit g (100 ml)$^{-1}$.

High-Performance Liquid Chromatography (HPLC)

For analytical HPLC, columns with a chiral stationary phase were used, which had a length of 250 mm and a diameter of 4.6 mm. Enantiomeric excesses (ee) were calculated from the enantiomeric ratios from the HPLC chromatograms.

Chemicals

6-Bromo-3-methyl-3,4-dihydroquinazolin-2(1H)-one was prepared as described in WO 2013/027168 A1. The sulfoximines, in achiral or racemic form or their respective (S) and (R) enantiomers, were prepared by methods as described in Angew. Chem. 2016, 128, 7319-7323 or Chem. Commun. 2017, 53, 348-351 or Tetrahedron: Asymmetry 1997, 8, 909-912 or Acta Chem. Scand. 1996, 50, 305-315. The sulfonediimides were prepared by methods as described in Angew. Chem. 2012, 124, 4516-4519. The sulfonimide amides were prepared by methods as described in Chem. Eur. J. 2017, 23, 15189-15193.

Example 1: Preparation of the Compounds 1.1 Preparation of (3-methyl-2-oxo-1,2,3,4-tetrahydroquinazolin-6-yl)Boronic Acid

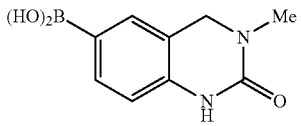 [SMILES: CN1Cc2cc(B(O)O)ccc2NC1=O]

A three-neck flask was charged with [1,1'-bis(diphenylphosphino)ferrocene]dichloropalladium(II) (0.02 equiv.) and 2-dicyclohexylphosphino-2',6'-dimethoxybiphenyl (0.04 equiv.). After addition of dry ethanol (c=0.2 mol/l), the mixture was stirred at an oil bath temperature of 95° C. under argon for 20 min. 6-Bromo-3-methyl-3,4-dihydroquinazolin-2(1H)-one, potassium acetate (2.9 equiv.) and tetrahydroxydiboron (3.0 equiv.) were added to the cooled mixture in an opposing flow of argon. The mixture was stirred at an oil bath temperature of 95° C. for 5 h and then at 50° C. overnight. Monitoring via thin-layer chromatography (ethyl acetate/acetone=1:1) indicated incomplete conversion, and so further tetrahydroxydiboron (0.5 equiv.) was added and the mixture was stirred again at an oil bath temperature of 95° C. The reaction mixture was cooled down to room temperature, water was added, and the mixture was stirred for 1 h. The solids were filtered off with suction and analysed by NMR spectroscopy. The volume of the filtrate was reduced in a membrane pump vacuum at a water bath temperature of 40° C. until solids precipitated out again, which were again filtered off with suction and analysed by NMR spectroscopy. This procedure was repeated several times. Sufficiently clean solids fractions were combined, and hence the product was isolated as a sand-coloured solid having a melting point of >240° C. (decomposition). The compound was confirmed by means of nuclear spin resonance spectroscopy and mass spectrometry analyses.

Synthesis Methods and Analysis of the Sulfoximines 1.2 Preparation of rac-N-(3-methyl-2-oxo-1,2,3,4-tetrahydroquinazolin-6-yl)-S-(2-methoxyphenyl)-S-methylsulfoximine (MF1)

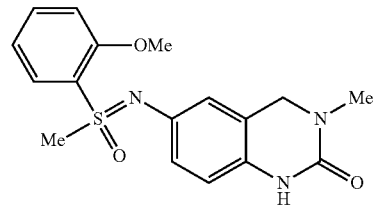 [SMILES: COc1ccccc1S(C)(=O)=Nc1ccc2c(c1)CN(C)C(=O)N2]

A pressure tube was charged with S-(2-methoxyphenyl)-S-methylsulfoximine (1.6 equiv.), 6-bromo-3-methyl-3,4-dihydroquinazolin-2(1H)-one, caesium carbonate (1.6 equiv.), tris(dibenzylideneacetone)dipalladium(0) (0.13 equiv.), 2-dicyclohexylphosphino-2',4',6'-triisopropylbiphenyl (0.22 equiv.) and a magnetic stirrer bar. The pressure tube was evacuated under high vacuum and filled with argon. In an opposing stream of argon, dry 1,4-dioxane (c=0.06 mol/l) was added, and the reaction mixture was stirred at an oil bath temperature of 110° C. for 22 h. The cooled suspension was filtered through kieselguhr, and the kieselguhr layer was washed with ethyl acetate. The solvent from the filtrate was removed in a membrane pump vacuum at a water bath temperature of 50° C. The crude product was worked up twice by column chromatography (silica gel, acetone or diethyl ether/acetone=2:1). A little diethyl ether was added to the product, and the suspension was treated in an ultrasound bath. The diethyl ether was pipetted off, and the product was isolated as a white solid having a melting point of 194-196° C. The compound was confirmed by means of infrared spectroscopy, nuclear spin resonance spectroscopy and mass spectrometry analyses.

1.3 Preparation of (S)—N-(3-methyl-2-oxo-1,2,3,4-tetrahydroquinazolin-6-yl)-S-(2-methoxyphenyl)-S-methylsulfoximine (MF1-S)

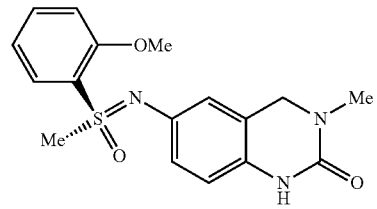 [SMILES: COc1ccccc1[S@](C)(=O)=Nc1ccc2c(c1)CN(C)C(=O)N2]

A test tube was charged with (S)—S-(2-methoxyphenyl)-S-methylsulfoximine, (3-methyl-2-oxo-1,2,3,4-tetrahydroquinazolin-6-yl)boronic acid (1.8 equiv.), copper(II) acetate (0.17 equiv.) and a magnetic stirrer bar. Dry methanol (c=0.26 mol/l) was added to the test tube. The test tube was placed in a round-bottom flask, atop which was placed a calcium chloride-filled drying tube. The reaction mixture was stirred under air at room temperature for 43 h. The solvent was removed in a membrane pump vacuum at a water bath temperature of 50° C. The remaining residue was treated by column chromatography (silica gel, diethyl ether/acetone=2:1), and the product was obtained as a light brown solid having a melting point of >218° C. (decomposition). The compound was confirmed by means of nuclear spin resonance spectroscopy analyses. The specific rotation $[\alpha]_D$ was +279.3 (c=0.51 in CHCl$_3$).

1.4 Preparation of (R)—N-(3-methyl-2-oxo-1,2,3,4-tetrahydroquinazolin-6-yl)-S-(2-methoxyphenyl)-S-methylsulfoximine (MF1-R)

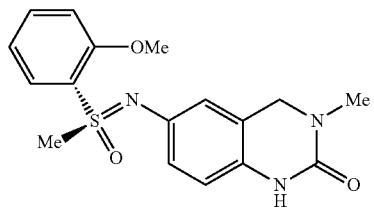

A test tube was charged with (R)—S-(2-methoxyphenyl)-S-methylsulfoximine, (3-methyl-2-oxo-1,2,3,4-tetrahydroquinazolin-6-yl)boronic acid (1.8 equiv.), copper(II) acetate (0.15 equiv.) and a magnetic stirrer bar. Dry methanol (c=0.25 mol/l) was added to the test tube. The test tube was placed in a round-bottom flask, atop which was placed a calcium chloride-filled drying tube. The reaction mixture was stirred under air at room temperature for 22 h. The solvent was removed in a membrane pump vacuum at a water bath temperature of 50° C. The remaining residue was treated by column chromatography (silica gel, diethyl ether/acetone=2:1), and the product was obtained as a light brown solid having a melting point of >212° C. (decomposition). The compound was confirmed by means of nuclear spin resonance spectroscopy analyses. The specific rotation $[\alpha]_D$ was −270.1 (c=0.47 in CHCl$_3$).

1.5 Preparation of rac-N-(3-methyl-2-oxo-1,2,3,4-tetrahydroquinazolin-6-yl)-S-methyl-S-phenylsulfoximine (MF2)

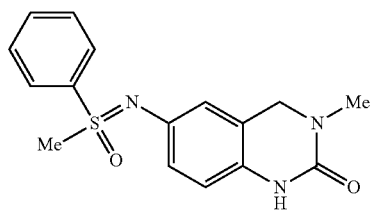 [SMILES: CN1Cc2cc(N=S(C)(=O)c3ccccc3)ccc2NC1=O]

A pressure tube was charged with S-methyl-S-phenylsulfoximine (1.7 equiv.), 6-bromo-3-methyl-3,4-dihydroquinazolin-2(1H)-one, caesium carbonate (2.2 equiv.), tris(dibenzylideneacetone)-dipalladium(0) (0.1 equiv.), 2-dicyclohexylphosphino-2',4',6'-triisopropylbiphenyl (0.14 equiv.) and a magnetic stirrer bar. The pressure tube was evacuated under high vacuum and filled with argon. In an opposing argon stream, dry 1,4-dioxane (c=0.2 mol/l) was added and the reaction mixture was stirred at an oil bath temperature of 130° C. for 42 h. The cooled suspension was filtered through kieselguhr, and the kieselguhr layer was washed with ethyl acetate. The solvent from the filtrate was removed in a membrane pump vacuum at a water bath temperature of 50° C. The crude product was treated by column chromatography twice (silica gel, diethyl ether/acetone=1:1 and diethyl ether/acetone=2:1). The product was isolated as a yellow solid with a melting point of 196-197° C. The compound was confirmed by means of infrared spectroscopy, nuclear spin resonance spectroscopy and mass spectrometry analyses.

1.6 Preparation of (S)—N-(3-methyl-2-oxo-1,2,3,4-tetrahydroquinazolin-6-yl)-S-methyl-S-phenylsulfoximine (MF2-S)

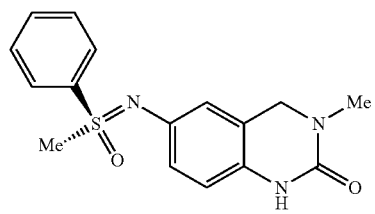

A test tube was charged with (S)—S-methyl-S-phenylsulfoximine, (3-methyl-2-oxo-1,2,3,4-tetrahydroquinazolin-6-yl)boronic acid (2.0 equiv.), copper(II) acetate (0.11 equiv.) and a magnetic stirrer bar. Dry methanol (c=0.3 mol/l) was added to the test tube. The test tube was placed in a round-bottom flask, atop which was placed a calcium chloride-filled drying tube. The reaction mixture was stirred under air at room temperature for 40 h. The solvent was removed in a membrane pump vacuum at a water bath temperature of 50° C. The remaining residue was treated by column chromatography (silica gel, diethyl ether/acetone=2:1), and the product was obtained as a pale yellow solid having a melting point of 135-137° C. The compound was confirmed by means of nuclear spin resonance spectroscopy analyses. The specific rotation $[\alpha]_D$ was +136.9 (c=0.35 in CHCl$_3$).

1.7 Preparation of (R)—N-(3-methyl-2-oxo-1,2,3,4-tetrahydroquinazolin-6-yl)-S-Methyl-S-Phenylsulfoximine (MF2-R)

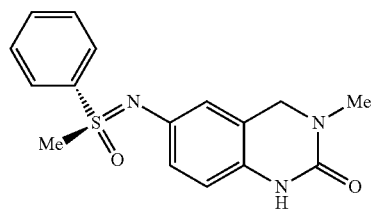

A test tube was charged with (R)—S-methyl-S-phenylsulfoximine, (3-methyl-2-oxo-1,2,3,4-tetrahydroquinazolin-6-yl)boronic acid (2.3 equiv.), copper(II) acetate (0.11 equiv.) and a magnetic stirrer bar. Dry methanol (c=0.3 mol/l) was added to the test tube. The test tube was placed in a round-bottom flask, atop which was placed a calcium chloride-filled drying tube. The reaction mixture was stirred under air at room temperature for 23 h. The solvent was removed in a membrane pump vacuum at a water bath temperature of 50° C. The remaining residue was treated by column chromatography twice (silica gel, diethyl ether/ acetone=2:1 and dichloromethane/acetone=1:1), and the product was obtained as a white solid having a melting point of 133-135° C. The compound was confirmed by means of nuclear spin resonance spectroscopy analyses. The specific rotation $[\alpha]_D$ was −100.7 (c=0.29 in CHCl$_3$).

1.8 Preparation of N-(3-methyl-2-oxo-1,2,3,4-tetrahydroquinazolin-6-yl)-S,S-diphenylsulfoximine (MF3)

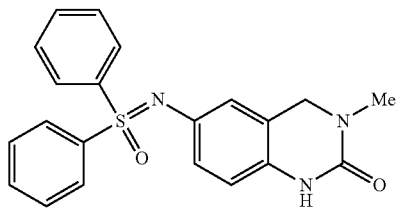 [SMILES: CN1Cc2cc(N=S(=O)(c3ccccc3)c3ccccc3)ccc2NC1=O]

A pressure tube was charged with S,S-diphenylsulfoximine, 6-bromo-3-methyl-3,4-dihydroquinazolin-2(1H)-one (1.7 equiv.), caesium carbonate (2.1 equiv.), tris(dibenzylideneacetone)dipalladium(0) (0.11 equiv.), 2-dicyclohexylphosphino-2',4',6'-triisopropylbiphenyl (0.18 equiv.) and a magnetic stirrer bar. The pressure tube was evacuated under high vacuum and filled with argon. In an opposing argon stream, dry 1,4-dioxane (c=0.1 mol/l) was added, and the reaction mixture was stirred at an oil bath temperature of 130° C. for 27 h. The cooled suspension was filtered through kieselguhr, and the kieselguhr layer was washed with ethyl acetate. The solvent from the filtrate was removed in a membrane pump vacuum at a water bath temperature of 50° C. The product was purified by column chromatography (silica gel, diethyl ether/acetone=2:1). Subsequently, a little diethyl ether was added to the substance, and the suspension was treated briefly in an ultrasound bath. The diethyl ether was pipetted off, and the product was isolated as a white solid having a melting point of 225-227° C. The compound was confirmed by means of nuclear spin resonance spectroscopy, mass spectrometry and infrared spectroscopy analyses.

1.9 Preparation of rac-N-(3-methyl-2-oxo-1,2,3,4-tetrahydroquinazolin-6-yl)-S-cyclohexyl-S-methylsulfoximine (MF4)

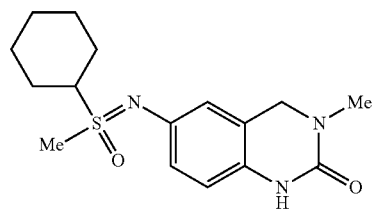 [SMILES: CN1Cc2cc(N=S(C)(=O)C3CCCCC3)ccc2NC1=O]

The compound was synthesized by means of two methods A and B.

Method A: A pressure tube was charged with S-cyclohexyl-S-methylsulfoximine, 6-bromo-3-methyl-3,4-dihydroquinazolin-2(1H)-one (1.7 equiv.), caesium carbonate (2.4 equiv.), tris(dibenzylideneacetone)dipalladium(0) (0.1 equiv.), 2-dicyclohexylphosphino-2',4',6'-triisopropylbiphenyl (0.15 equiv.) and a magnetic stirrer bar. The pressure tube was evacuated under high vacuum and filled with argon. In an opposing argon stream, dry 1,4-dioxane (c=0.13 mol/l) was added, and the reaction mixture was stirred at an oil bath temperature of 130° C. for 27 h. The cooled suspension was filtered through kieselguhr, and the kieselguhr layer was washed with ethyl acetate. The solvent from the filtrate was removed in a membrane pump vacuum at a water bath temperature of 50° C. The remaining residue was treated by column chromatography (silica gel, diethyl ether/acetone=2:1). The isolated product was purified by a second column chromatography (silica gel, ethyl acetate/methanol=10:1) and obtained as a white solid.

Method B: A test tube was charged with S-cyclohexyl-S-methylsulfoximine, (3-methyl-2-oxo-1,2,3,4-tetrahydroquinazolin-6-yl)boronic acid (1.4 equiv.), copper(II) acetate (0.1 equiv.) and a magnetic stirrer bar. Dry methanol (c=0.25 mol/l) was added to the test tube. The test tube was placed in a round-bottom flask, atop which was placed a calcium chloride-filled drying tube. The reaction mixture was stirred under air at room temperature for 45 h. The solvent was removed in a membrane pump vacuum at a water bath temperature of 50° C. The remaining residue was worked up by column chromatography (silica gel, diethyl ether/acetone=2:1). The product was purified twice more by column chromatography (silica gel, acetone and ethyl acetate/methanol=10:1) and isolated as a yellow-brown solid having a melting point of 165-167° C. The compound was confirmed by means of infrared spectroscopy, nuclear spin resonance spectroscopy and mass spectrometry analyses.

The products from the two batches were combined, and the enantiomers were separated from one another by means of a preparative HPLC column under the conditions for the analytical AD column. Subsequently, the individual enantiomers were each purified again by column chromatography (silica gel, ethyl acetate/methanol=10:1) and obtained as white solids.

The enantiomer (+)-N-(3-methyl-2-oxo-1,2,3,4-tetrahydroquinazolin-6-yl)-S-cyclohexyl-S-methylsulfoximine had a melting point of 191-193° C. and a specific rotation $[\alpha]_D$ of +22.4 (c=0.38 in CHCl$_3$). The enantiomer (−)-N-(3-methyl-2-oxo-1,2,3,4-tetrahydroquinazolin-6-yl)-S-cyclohexyl-S-methylsulfoximine had a melting point of 195-197° C. and a specific rotation $[\alpha]_D$ of −22.2 (c=0.37 in CHCl$_3$).

1.10 Preparation and Analysis of the Sulfonediimides and Sulfonimide Amides

Method A:

A baked-out Schlenk tube with magnetic stirrer bar and septum was charged with the sulfonediimide or sulfonimide amide, 6-bromo-3-methyl-3,4-dihydroquinazolin-2(1H)-one (1.5 equiv.), caesium carbonate (1.5 equiv.), tris(dibenzylideneacetone)dipalladium(0) (0.15 equiv.), and 2-dicyclohexylphosphino-2',4',6'-triisopropylbiphenyl (0.3 equiv.). The Schlenk tube was evacuated under high vacuum and filled with argon. In an opposing argon stream, dry 1,4-dioxane was added and the reaction mixture was stirred at an oil bath temperature of 110° C. for 12 h. The cooled suspension was filtered through a Celite layer (Celite Standard Super Cel, pH=7-8) and washed through with a dichloromethane/methanol solution (10:1). The solvent from the filtrate was removed in a membrane pump vacuum at a water bath temperature of 40° C., and the residue was purified by column chromatography on silica gel with a dichloromethane/methanol gradient solution (1:0 to 30:1).

Method B:

A baked-out Schlenk tube with magnetic stirrer bar and septum was charged with the sulfonediimide or sulfonimide amide, (3-methyl-2-oxo-1,2,3,4-tetrahydroquinazolin-6-yl) boronic acid (1.5 equiv.) and copper(II) acetate (0.2 equiv.). The Schlenk tube was evacuated under high vacuum and filled with argon. In an opposing argon stream, dry dimethylformamide or methanol was added, the septum was replaced by a calcium chloride-filled drying tube, and the solution was stirred at room temperature for 24 hours. The solution was filtered through a Celite layer (Celite Standard Super Cel, pH=7-8) and washed through with a dichloromethane/methanol solution (10:1). The solvent from the filtrate was removed in a membrane pump vacuum at a water bath temperature of 40° C., and the residue was purified by column chromatography on silica gel with a dichloromethane/methanol gradient solution (1:0 to 30:1).

1.10.1 rac-N-(3-methyl-2-oxo-1,2,3,4-tetrahydroquinazolin-6-yl)-N-phenyl-S-methyl-S-phenylsulfonediimide (JHS1)

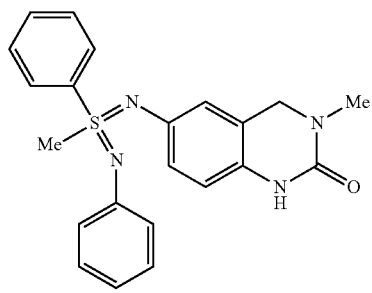 [SMILES: CN1Cc2cc(N=S(C)(=Nc3ccccc3)c3ccccc3)ccc2NC1=O]

The compound was prepared successfully in DMF by method A and method B alike, was confirmed by means of nuclear spin resonance spectroscopy, mass spectrometry and infrared spectroscopy analyses, and had a melting point of 102-103° C.

1.10.2 (S)—N-(3-methyl-2-oxo-1,2,3,4-tetrahydroquinazolin-6-yl)-N-phenyl-S-methyl-S-phenylsulfonediimide (JHS1-S)

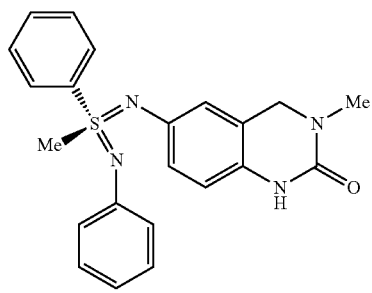 [SMILES: CN1Cc2cc(N=[S@](C)(=Nc3ccccc3)c3ccccc3)ccc2NC1=O]

The compound was prepared by means of method A, was confirmed by means of nuclear spin resonance spectroscopy, mass spectrometry and infrared spectroscopy analyses, and had a melting point of 83-84° C. and a specific rotation $[\alpha]_D$ of −612.8 (c=1.95 in $CHCl_3$).

1.10.3 (R)—N-(3-methyl-2-oxo-1,2,3,4-tetrahydroquinazolin-6-yl)-N'-phenyl-S-methyl-S-phenylsulfonediimide (JHS1-R)

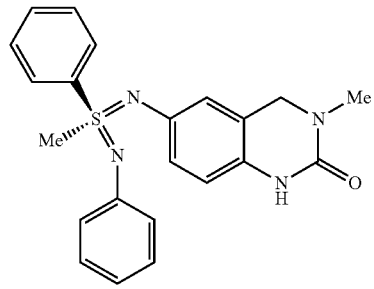 [SMILES: CN1Cc2cc(N=[S@@](C)(=Nc3ccccc3)c3ccccc3)ccc2NC1=O]

The compound was prepared by means of method A, was confirmed by means of nuclear spin resonance spectroscopy, mass spectrometry and infrared spectroscopy analyses, and had a melting point of 84-85° C. and a specific rotation $[\alpha]_D$ of 601.5 (c=1.95 in $CHCl_3$).

1.10.4 rac-N-(3-methyl-2-oxo-1,2,3,4-tetrahydroquinazolin-6-yl)-N'—H—S-methyl-S-phenylsulfonediimide (JHS2)

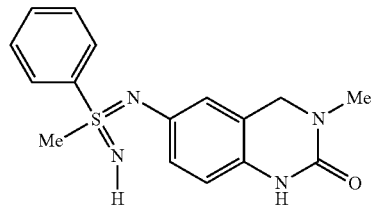 [SMILES: CN1Cc2cc(N=S(C)(=N)c3ccccc3)ccc2NC1=O]

The compound was prepared in methanol by means of method B, was confirmed by means of nuclear spin resonance spectroscopy, mass spectrometry and infrared spectroscopy analyses, and had a melting point of 119-120° C.

1.10.5 rac-N-(3-methyl-2-oxo-1,2,3,4-tetrahydroquinazolin-6-yl)-N-methyl-S-methyl-S-phenylsulfonediimide (JHS3)

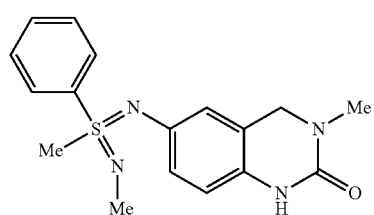 [SMILES: CN=S(C)(=Nc1ccc2c(c1)CN(C)C(=O)N2)c1ccccc1]

The compound was prepared in methanol by means of method B, was confirmed by means of nuclear spin resonance spectroscopy, mass spectrometry and infrared spectroscopy analyses, and had a melting point of 92-93° C.

1.10.6 rac-1-[N-(3-methyl-2-oxo-1,2,3,4-tetrahydro-quinazolin-6-yl-S-phenylsulfonimidoyl]piperidine (JHS4)

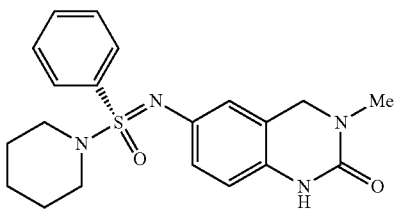 [SMILES: CN1Cc2cc(N=[S@](=O)(c3ccccc3)N3CCCCC3)ccc2NC1=O]

The compound was prepared in DMF by means of method A and method B, was confirmed by means of nuclear spin resonance spectroscopy, mass spectrometry and infrared spectroscopy analyses, and had a melting point of 129-130° C.

Example 2: Study of the Effects of the Enantiomers MF1-R, MF1-S, JHS1-R and JHS1-S on Metabolic Activity in Leukaemia Cell Lines The erythroleukaemia cell line HEL (JAK2V617F-positive), the AML cell line Molm-14 and the chronic myeloid leukaemia (CML) cell line K562 (BCR-ABL-positive) were used for cell experiments.

Compounds MF1-R, MF1-S, JHS1-R and JHS1-S were dissolved in DMSO, and each was used in concentrations of 0.1 µM, 1 µM, 10 µM and 20 µM. Correspondingly, DMSO was included in each case as a control treatment, and the metabolic activity thereof was set to 100%. The HEL, Molm-14 and K562 cell lines were treated with the respective compounds in the different concentrations and, after 72 h in culture, the metabolic activity, which gives information about the growth of the cells, was determined by means of MTT [3-(4,5-dimethylthiazol-2-yl)-2,5-diphenyltetrazolium bromide] assay.

The absorptions determined, which correspond to the metabolic activity, are shown for the HEL, Molm-14 and K562 cells in FIGS. 1A-C respectively. As can be inferred from FIG. 1, the (S) enantiomer MF1-S showed a comparable effect on the metabolic activity of HEL and Molm-14 cells to PFI-1, whereas the (R) enantiomer MF1-R was virtually inactive. This shows that the chirality of compound MF1 affects the activity. Such an effect was barely observable for the enantiomers JHS1-R and JHS1-S. K562 cells were used as negative controls that show barely any effect on the inhibition of BRD4 (FIG. 1C). Accordingly, there was barely any drop in the metabolic activity of the K562 cells treated as a result of the treatment with the compounds.

Example 3: Study of the Effects of the Compounds JHS1, JHS2, MF2 and JHS3 on Metabolic Activity in Leukaemia Cell Lines Racemic mixtures of compounds JHS1, JHS2, MF2 and JHS3 were dissolved in DMSO and each was used in concentrations of 10 nM, 100 nM, 1 µM, 10 µM and 20 µM, and DMSO was correspondingly included as control treatment. The HEL, Molm-14 cell lines, as described in Example 2, were treated with the respective compounds in the different concentrations and, after 72 h, metabolic activity was determined by means of MTT assay.

The metabolic activities determined are shown for the HEL, Molm-14 and K562 cells in FIGS. 2A-C respectively. As can be inferred from FIG. 2, the racemic mixtures of compounds MF2 and JHS1 reduced the metabolic activity of HEL and Molm-14 cells at concentrations of 10 and 20 µM. By contrast, compounds JHS2 and JHS3 were inactive.

Example 4: Study of the Effects of the MF2-R and MF2-S Enantiomers on Metabolic Activity in Leukaemia Cell Lines The two enantiomers of MF2 were each synthesized individually hereinafter, and MF2-R and MF2-S were examined individually in the MTT cell experiment as described in Example 2 and compared with the racemic mixture of MF2 and PFI-1. In addition, the average inhibitory concentration ($IC_{50}$) was calculated.

The metabolic activities determined are shown for the HEL, Molm-14 and K562 cells in FIGS. 3A-C respectively. The $IC_{50}$ values for the HEL, Molm-14 and K562 cells are shown in FIGS. 3D-F respectively. As can be inferred from FIG. 3, it was found that the compound MF2-S gave a significantly greater reduction in the metabolic activity of HEL cells (FIG. 3A, D; 37.24%±6.19 vs. 72.95%±12.7) and Molm-14 cells (FIG. 3B, E; 55.19%±0.72 vs. 80.43%±1.324) than the comparative compound PFI-1 in a concentration of 1 µM.

This shows that the activity of racemic MF2 was improved and, in the form of the (S) enantiomer MF2-S, a compound having improved efficiency compared to PFI-1 was generated. By contrast, the (R) enantiomer MF2-R lost inhibitory activity compared to MF2. In the case of higher concentrations of the inhibitors (10 µM and 20 µM), the efficiency of the reduction in metabolic activity balanced out again. However, a reduction in the dose required is of crucial importance since this could reduce potential side effects.

Example 5: Study of the Effects of the MF2-R and MF2-S Enantiomers on Proliferation in Leukaemia Cell Lines In further experiments, HEL, Molm-14 and K562 cells were incubated in triplicates each with 1 or 5 µM of the MF2-R and MF2-S enantiomers, and the cell counts of the cells thus treated were determined in a Thoma chamber and documented at the starting point and after 24, 48 and 72 h after trypan blue staining. The cell growth described here is referred to as proliferation, and gives information as to the cell divisions that proceeded in the specified period.

The respective average cell counts are shown for HEL, Molm-14 and K562 cells in FIGS. 4A-C respectively. FIG. 4D shows the relative cell count, and FIG. 4E the average cell population. As can be inferred from FIG. 4, the (S) enantiomer MF2-S, by comparison with PFI-1, significantly reduced the cell proliferation of HEL and Molm-14. FIG. 4D shows the significant reduction for 5 µM MF2-S compared to PFI-1.

During the proliferation, the cells go through different stages of the cell cycle in which genomic DNA is replicated, the cell nucleus is broken down and cell division takes place, resulting in two identical cells. As can be inferred from FIG. 4E, the synthesis phase (S phase) was more significantly inhibited by MF2-S than by PFI-1, with the rise in the G0/G1 phase being typical of a block of the cell cycle. The subG1 phase indicates the percentage of dead cells, and here too significantly higher proportions of the HEL and Molm-14 cells were accumulated if treated with MF2-S.

During the study of cell proliferation, the viability of the cell lines was likewise determined from the trypan blue staining. Trypan blue cannot penetrate into living cells. Viability is shown for the HEL, Molm-14 and K562 cells in FIGS. 5A-C respectively. FIG. 5D shows relative viability for 5 µM PH-1 and MF2-S. As can be inferred from FIGS. 5A-D, MF2-S in a concentration of 5 µM in particular significantly reduced the viability of the HEL and Molm-14 cells compared to PFI-1.

In addition, a possible induction of apoptosis in the cell lines described by compound MF2 was examined. For this purpose, the cleavage of the poly(ADP-ribose) polymerase 1 (PARP1) protein was examined after treatment for 24 and 48 h of the HEL, Molm-14 and K562 cells with 5 µM in each case of the racemic mixture MF2 and of the (S) and (R) enantiomers MF2-S and MF2-R by comparison with PFI-1. The cleavage of the PARP1 protein is an indicator of incipient apoptosis (cell death) of the cells, and the cleavage products of PARP1 were accordingly examined by Western blot. In detail, after the inhibitor treatment, cell lysates were produced with RIPA lysis buffer. Protein concentrations were determined with the Bradford protein assay using a Nanodrop Spectrometer at 595 nm. To 25 µg of the protein lysates was added 4×Lämmli sample buffer, followed by denaturing at 65° C. for 5 min and introduction into the SDS-Page. The proteins were transferred by the wet blot method to a PVDF membrane at 100 mA overnight. The membrane was blocked with 10% BSA in TBS-T buffer. The primary antibodies were incubated at 4° C. overnight, and the HRP-labelled antibodies at room temperature with the membrane for 45 min. The proteins were detected by means of PCA-ECL solution using a chemiluminescence detector (Fusion SL, PeqLab). DMSO-treated cells served as control. The glycerinaldehyde-3-phosphate dehydrogenase (GADPH) protein was determined in order to demonstrate uniform application of the amount of protein.

FIG. 5E shows the Western blots of the HEL, Molm-14 and K562 cell extracts. As can be inferred from FIG. 5E, the marked band for the PARP1 cleavage product after treatment with MF2-S for 48 h was more marked in HEL cells than in the case of PFI-1 treatment, whereas the band in Molm-14 cells appeared to have the same intensity. However, less uncleaved PARP1 was apparent after treatment with 5 µM MF2-S for 48 h. It is assumed that the inhibition of BRD4 in the cell lines examined led to an enhanced reduction in metabolic activity and proliferation, and to a lower level of induction of cell apoptosis. Nevertheless, MF2-S (5 µM) induced apoptosis more strongly than the other compounds examined.

Example 6: Study of the Effects of the MF2-R and MF2-S Enantiomers on Human Tissue In order to examine whether the enantiomer MF2-S likewise shows an improved response in primary material from AML (acute myeloid leukaemia) patients and MPN (myeloproliferative neoplasia) patients, what are called colony formation assays (CFU assays) were conducted. For this purpose, mononuclear cells (PBMC: mononuclear cells from peripheral blood) or CD34-positive stem cells (CD34+ cells) were isolated from the blood of four healthy controls and three AML or MPN patients and introduced into semisolid medium, to each of which 1 µM or 5 µM of MFS-2 or PFI-1 have been added. Individual cells in the CFU assay form cell colonies in culture after 12 days, unless the formation thereof is prevented by inhibitors.

FIG. 6A shows the colony count of the four controls. As can be inferred from FIG. 6A, in controls 1 (PBMC) and 2 (CD34+ cells), a treatment with 5 µM PFI-1 or MF2-S likewise reduced the amount of colonies. In order to reduce this non-specific effect on healthy cells, in CD34+ controls 3 and 4, a concentration of 1 µM MFS-2 or PFI-1 was likewise used. As can be inferred from FIG. 6A, 1 µM MFS-2 or PH-1 reduced the colony count of the controls to a lesser degree. In control 4, the colony count was not significantly reduced by 1 µM MF2-S.

FIG. 6B shows the results of the CFU assays of three AML patients. As can be inferred from FIG. 6B, MF2-S in the respective concentrations of 1 µM and 5 µM in each case reduced the colony count to a significantly greater degree than PFI-1. Moreover, 1 µM MF2-S was found here to be just as efficient as 5 µM PFI-1.

FIG. 6C shows the results of the CFU assays of the three MPN patients. Myeloproliferative neoplasia includes three conventional Philadelphia chromosome-negative (BCR-ABL-negative) disease entities: polycythemia vera (PV), essential thrombocythaemia (ET) and primary myelofibrosis (PMF). Both PV and ET can progress to become myelofibrosis (MF), which usually means a fatal deterioration in the disease state and in the success of treatment. All the MPN patients involved in these studies were JAK2V617F-positive. As can be inferred from FIG. 6C, the treatment of the cells in the CFU assay with 5 µM MF2-S led to a significantly greater reduction in each case in the colony count. In addition, 1 µM MF2-S very efficiently reduced the colony count from material from the PMF patient, while this was not the case by comparison with PFI-1 for the material from the ET patient.

Moreover, by in silico docking analyses and molecular dynamics (MD) simulations with the aid of the x-ray structure of the PFI-1-bound bromodomain of BRD4, it was confirmed that MF2-S should be the best ligand for the bromodomain. It was found here that, in the case of MF2-S, the (S)—S-methyl-S-phenylsulfonimidoyl group is oriented towards a hydrophobic region of BRD4, whereas the (R)—S-methyl-S-phenylsulfonimidoyl fragment of MF2-R pointed in the opposite direction. It is assumed that this results in loss of interaction. Without being tied to any particular theory, it is assumed that this explains the improved efficiency of the (S) enantiomer MF2-S compared to the (R) enantiomer MF2-R.

Example 7: Study of the Selectivity of the MF2-S Enantiomer

In order to study the selectivity of the MF2-S compound, Reaction Biology Corp. (PA, USA) conducted a thermal shift assay (BromoMELT™ assay) with the compound MF2-S, and PFI-1 as comparative compound. This assay gives information about the specific binding of MF2-S to 76 bromodomain-containing proteins. The experiment was conducted in duplicates at a concentration of 10 µM. The dissociation of the inhibitors (3=PFI-1; (S)-4a=MF2-S) from the bromodomain-containing proteins with rising temperatures compared to a DMSO control is reflected by the value ΔTm.

FIG. 7A shows the ΔTm values obtained by the thermal shift assay versus DMSO control for the compound MF2-S and the comparative compound PFI-1. As can be inferred from FIG. 7A, MF2-S, apart from BRDT-2, gives equally good or better binding of proteins from the BET family compared to the comparative compound PFI-1. It was likewise possible to show higher specificity for BRD4. FIG. 7B illustrates the specificity of all bromodomain-containing proteins analysed for the comparative compound PFI-1, and FIG. 7C for the compound MF2-S. Changes in temperature are reported here with increasing radius for higher Tm values. As can be inferred from FIGS. 7B and 7C, both PFI-1 and MF2-S specifically bind proteins of the BET family, with stronger binding of BRD2 by PFI-1 and more specific binding of BRD4 by MF2-S.

The results overall show that new bromodomain inhibitors can be provided, with the compound MF2-S showing better results compared to the original bromodomain inhibitor PH-1. These results were confirmed in primary patient material from AML and MPN patients.

The invention claimed is:

1. A compound according to formula (1) or a pharmaceutically acceptable salt thereof:

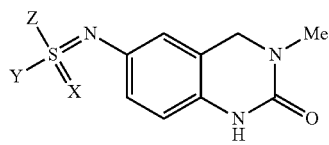
(1)

wherein:
X is selected from O or N—$R^1$ where $R^1$ is selected from the group consisting of hydrogen, cyano, $C_{1-6}$-alkyl or in each case optionally mono- or poly-$C_{1-6}$-alkyl-substituted $C_{3-7}$-cycloalkyl, aryl, a monocyclic $C_{5-6}$-heteroaryl group comprising a heteroatom selected from N, O or S, or pyrimidyl;

Y is selected from the group consisting of $C_{1-6}$-alkyl, in each case optionally mono- or poly-$C_{1-6}$-alkyl-substituted $C_{3-7}$-cycloalkyl, aryl, a monocyclic $C_{5-6}$-heteroaryl group comprising a heteroatom selected from N, O or S, or pyrimidyl, $NH_2$, $NHR^2$ and/or $NR^2R^3$, where $R^2$ and $R^3$ are selected from the group consisting of $C_{1-6}$-alkyl or in each case optionally mono- or poly-$C_{1-2}$-alkyl-substituted $C_{3-7}$-cycloalkyl, aryl, a monocyclic $C_{5-6}$-heteroaryl group comprising a heteroatom selected from N, O or S, or pyrimidyl, or $NR^2R^3$ is piperidyl;

Z is selected from cyclohexyl, aryl, a monocyclic $C_{5-6}$-heteroaryl group comprising a heteroatom selected from N, O or S, or pyrimidyl, each unsubstituted or mono- or polysubstituted by $C_{1-6}$-alkyl, $C_{1-5}$-alkoxy or mono- or poly-halogen-substituted $C_{1-6}$-alkyl; and Me is methyl.

2. The compound according to claim 1, wherein:
X is oxygen;
Y is selected from the group consisting of $C_{1-6}$-alkyl or in each case optionally mono- or poly-$C_{1-2}$-alkyl-substituted $C_{3-7}$-cycloalkyl, aryl, a monocyclic $C_{5-6}$-heteroaryl group comprising a heteroatom selected from N, O or S, or pyrimidyl; and
Z is selected from cyclohexyl, aryl, a monocyclic $C_{5-6}$-heteroaryl group comprising a heteroatom selected from N, O or S, or pyrimidyl, each unsubstituted or mono- or polysubstituted by $C_{1-6}$-alkyl, $C_{1-5}$-alkoxy or mono- or poly-halogen-substituted $C_{1-6}$-alkyl.

3. The compound according to claim 1, wherein the compound is selected from the group consisting of the compounds of the following formulae (MF1), (MF2), (MF3) or (MF4):

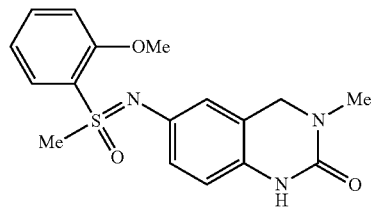
(MF1)

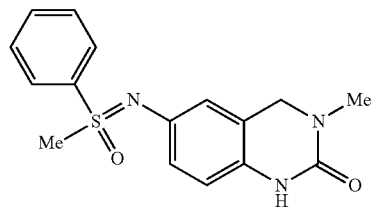
(MF2)

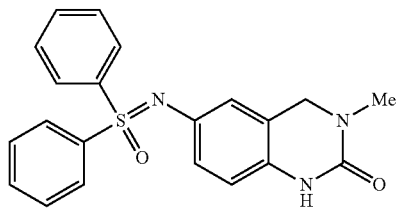
(MF3)

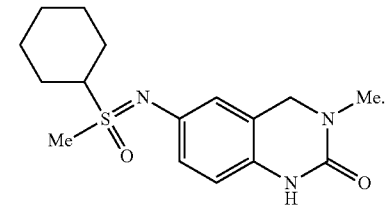
(MF4)

4. The compound according to claim 3, wherein the compound is the(S) enantiomer of the compounds of the formulae (MF1) or (MF2).

5. The compound according to claim 1, wherein:
X is N—$R^1$ where $R^1$ is selected from the group consisting of hydrogen, cyano, $C_{1-6}$-alkyl and/or in each case optionally mono- or poly-$C_{1-2}$-alkyl-substituted $C_{3-7}$-cycloalkyl, aryl, a monocyclic $C_{5-6}$-heteroaryl group comprising a heteroatom selected from N, O or S, or pyrimidyl;

Y is selected from the group consisting of $C_{1-6}$-alkyl and/or in each case optionally mono- or poly-$C_{1-2}$-alkyl-substituted $C_{3-7}$-cycloalkyl, aryl, a monocyclic $C_{5-6}$-heteroaryl group comprising a heteroatom selected from N, O or S, or pyrimidyl; and Z is selected from cyclohexyl, aryl, a monocyclic $C_{5-6}$-heteroaryl group comprising a heteroatom selected from N, O or S, or pyrimidyl, each unsubstituted or mono- or polysubstituted by $C_{1-6}$-alkyl, $C_{1-5}$-alkoxy or mono- or poly-halogen-substituted $C_{1-6}$-alkyl.

6. The compound according to claim 5, wherein the compound is selected from the group consisting of the compounds of the following formulae (JHS1), (JHS2) or (JHS3):

(JHS1)

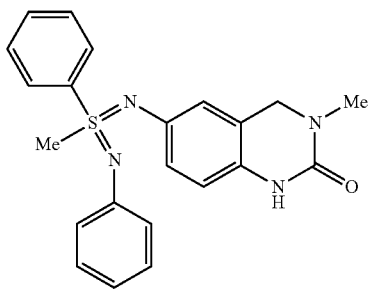

(JHS2)

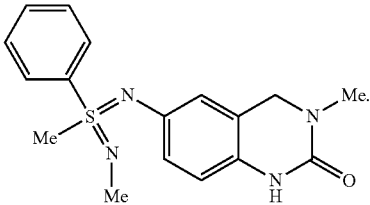

(JHS3)

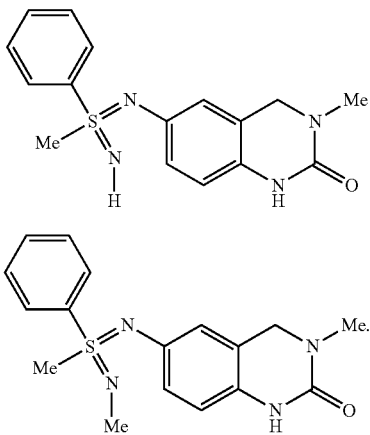

7. The compound according to claim 1, wherein:

X is oxygen;

Y is selected from the group consisting of $NH_2$, $NHR^2$ and $NR^2R^3$, where $R^2$ and $R^3$ are selected from the group consisting of $C_{1-6}$-alkyl or in each case optionally mono- or poly-$C_{1-2}$-alkyl-substituted $C_{3-7}$-cycloalkyl, aryl, a monocyclic $C_{5-6}$-heteroaryl group comprising a heteroatom selected from N, O or S, or pyrimidyl, or $NR^2R^3$ is piperidyl; and Z is selected from cyclohexyl, aryl, a monocyclic $C_{5-6}$-heteroaryl group comprising a heteroatom selected from N, O or S, or pyrimidyl, each unsubstituted or mono- or polysubstituted by $C_{1-6}$-alkyl, $C_{1-5}$-alkoxy or mono- or poly-halogen-substituted $C_{1-6}$-alkyl.

8. The compound according to claim 7, wherein the compound is selected from the group consisting of the compound of the following formula (JHS4) or one of the enantiomers thereof:

(JHS4)

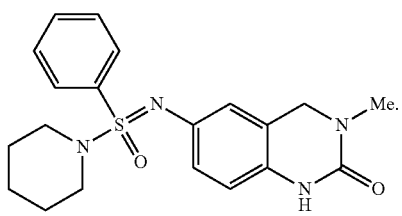

9. A method of producing a pharmaceutical composition, comprising combining the compound according claim 1 with one or more excipients or vehicles.

10. A pharmaceutical composition comprising an effective amount of a compound according to claim 1 and one or more pharmaceutically acceptable excipient or vehicle.

11. A method of treating acute myeloid leukaemia, the method comprising the step of administering to a subject a therapeutically effective amount of a compound according to claim 1.

12. A method of treating myeloproliferative neoplasia, the method comprising the step of administering to a subject a therapeutically effective amount of a compound according to claim 1.

\* \* \* \* \*